United States Patent
On

(10) Patent No.: US 8,711,252 B2
(45) Date of Patent: Apr. 29, 2014

(54) IMAGE PROCESSING DEVICE AND INFORMATION STORAGE MEDIUM INCLUDING MOTION VECTOR INFORMATION CALCULATION

(75) Inventor: Seigo On, Hachioji (JP)

(73) Assignee: Olympus Corporation, Tokyo (JP)

( * ) Notice: Subject to any disclaimer, the term of this patent is extended or adjusted under 35 U.S.C. 154(b) by 378 days.

(21) Appl. No.: 13/171,741

(22) Filed: Jun. 29, 2011

(65) Prior Publication Data

US 2011/0317043 A1 Dec. 29, 2011

(30) Foreign Application Priority Data

Jun. 29, 2010 (JP) ................................ 2010-147197

(51) Int. Cl.
*H04N 5/217* (2011.01)

(52) U.S. Cl.
USPC ............................................ 348/241; 348/71

(58) Field of Classification Search
USPC ................. 348/32–34, 45, 65–78, 162–168, 348/207.99, 216.1, 217.1, 241, 340, 342; 600/101–183; 362/572–575; 385/116–118; 396/14–18; 382/134; 250/363.01

See application file for complete search history.

(56) References Cited

U.S. PATENT DOCUMENTS

| | | | |
|---|---|---|---|
| 2004/0257438 A1* | 12/2004 | Doguchi et al. ................. | 348/65 |
| 2005/0096505 A1* | 5/2005 | Imaizumi et al. ............. | 600/180 |
| 2005/0182295 A1* | 8/2005 | Soper et al. ................... | 600/117 |
| 2007/0046778 A1* | 3/2007 | Ishihara et al. ................. | 348/68 |
| 2010/0054576 A1* | 3/2010 | Tsujita ........................... | 382/134 |
| 2010/0084563 A1* | 4/2010 | Ohno ....................... | 250/363.01 |
| 2010/0177180 A1* | 7/2010 | Yamaguchi et al. ............ | 348/65 |
| 2011/0169960 A1* | 7/2011 | Wagner ........................ | 348/162 |

FOREIGN PATENT DOCUMENTS

| | | |
|---|---|---|
| JP | 2007-252688 A | 10/2007 |
| JP | 2007-329524 A | 12/2007 |
| JP | 2008-311850 A | 12/2008 |
| JP | 2009-131615 A | 6/2009 |

OTHER PUBLICATIONS

Japanese Official Action dated Nov. 26, 2013 received in related application JP 2010-147197.

* cited by examiner

*Primary Examiner* — Lin Ye
*Assistant Examiner* — Dennis Hogue
(74) *Attorney, Agent, or Firm* — Scully, Scott, Murphy & Presser, PC

(57) ABSTRACT

An image processing device includes a normal light image acquisition section that acquires a normal light image, the normal light image being an image that includes information within a wavelength band of white light, a special light image acquisition section that acquires a special light image, the special light image being an image that includes information within a specific wavelength band, a normal light motion vector information calculation section that calculates normal light motion vector information based on a feature quantity included in the normal light image, the normal light motion vector information indicating a motion vector between a plurality of normal light images, and a noise reduction section that reduces an amount of noise included in the special light image based on the normal light motion vector information calculated by the normal light motion vector information calculation section.

7 Claims, 15 Drawing Sheets

FIG. 4
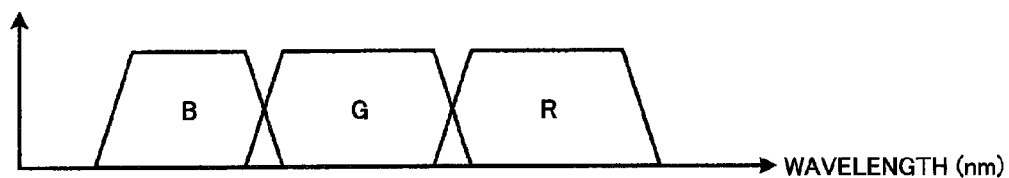
FIG. 5
FIG. 6
| B1<br>(0,0) | G1<br>(1,0) | B1<br>(2,0) | G1<br>(3,0) | B1<br>(4,0) |
|---|---|---|---|---|
| G1<br>(0,1) | B1<br>(1,1) | G1<br>(2,1) | B1<br>(3,1) | G1<br>(4,1) |
| B1<br>(0,2) | G1<br>(1,2) | B1<br>(2,2) | G1<br>(3,2) | B1<br>(4,2) |
| G1<br>(0,3) | B1<br>(1,3) | G1<br>(2,3) | B1<br>(3,3) | G1<br>(4,3) |
| B1<br>(0,4) | G1<br>(1,4) | B1<br>(2,4) | G1<br>(3,4) | B1<br>(4,4) |

.# IMAGE PROCESSING DEVICE AND INFORMATION STORAGE MEDIUM INCLUDING MOTION VECTOR INFORMATION CALCULATION

Japanese Patent Application No. 2010-147197 filed on Jun. 29, 2010, is hereby incorporated by reference in its entirety.

BACKGROUND

The present invention relates to an image processing device, an information storage medium, and the like.

A noise component is normally included in a video image signal. A frame-cyclic noise reduction process is known as a method that reduces such a noise component. Specifically, the amount of motion is detected from the preceding-frame output image and the current input image, and the degree of time averaging is controlled based on the amount of motion. The performance of the frame-cyclic noise reduction process depends on the motion estimation (detection) accuracy. A known motion estimation algorithm calculates the absolute difference in luminance between video image signals, and compares the absolute difference with a motion determination threshold value. For example, JP-A-2005-150903 discloses a method that determines that a motion has occurred when the absolute difference is larger than the motion determination threshold value.

SUMMARY

According to one aspect of the invention, there is provided an image processing device comprising:

a normal light image acquisition section that acquires a normal light image, the normal light image being an image that includes information within a wavelength band of white light;

a special light image acquisition section that acquires a special light image, the special light image being an image that includes information within a specific wavelength band;

a normal light motion vector information calculation section that calculates normal light motion vector information based on a feature quantity included in the normal light image, the normal light motion vector information indicating a motion vector between a plurality of normal light images; and a noise reduction section that reduces an amount of noise included in the special light image based on the normal light motion vector information calculated by the normal light motion vector information calculation section.

According to another aspect of the invention, there is provided an information storage medium storing a program that causes a computer to function as:

a normal light image acquisition section that acquires a normal light image, the normal light image being an image that includes information within a wavelength band of white light;

a special light image acquisition section that acquires a special light image, the special light image being an image that includes information within a specific wavelength band;

a normal light motion vector information calculation section that calculates normal light motion vector information based on a feature quantity included in the normal light image, the normal light motion vector information indicating a motion vector between a plurality of normal light images; and a noise reduction section that reduces an amount of noise included in the special light image based on the normal light motion vector information calculated by the normal light motion vector information calculation section.

BRIEF DESCRIPTION OF THE DRAWINGS

FIG. 4 shows the spectral characteristics of a normal light imaging element.

FIG. 5 shows the spectral characteristics (NBI) of a special light imaging element.

FIG. 6 shows an example of the filter construction of a special light imaging element.

DESCRIPTION OF EXEMPLARY EMBODIMENTS

Figure 1:
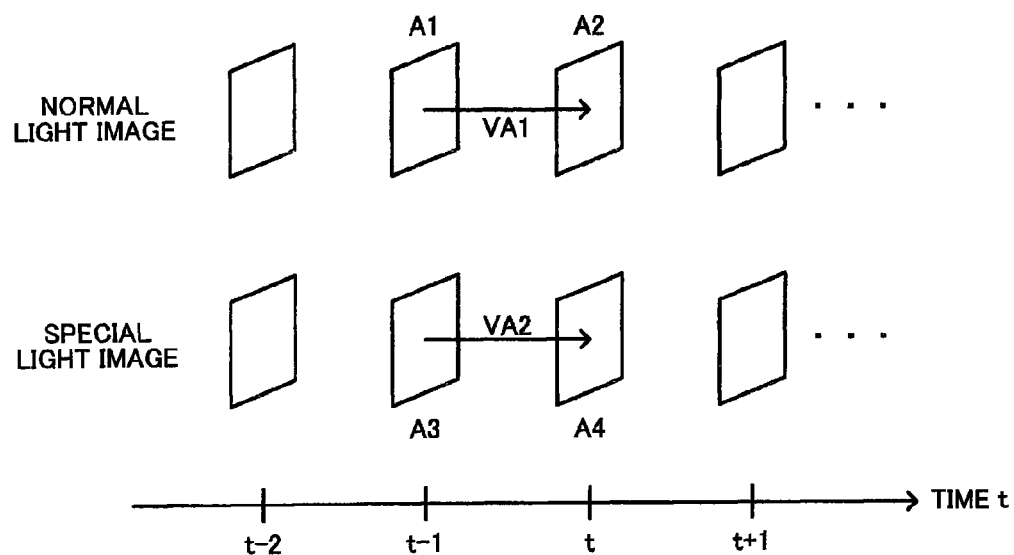
FIG. 1 is a view illustrative of the relationship between normal light motion vector information and special light motion vector information according to a first embodiment.

Several aspects of the invention may provide an image processing device, an information storage medium, and the like that can implement an appropriate noise reduction process by calculating a normal light motion vector from a plurality of normal light images, and utilizing the normal light motion vector for a special light image.

Several aspects of the invention may provide an image processing device, an information storage medium, and the like that can calculate an accurate amount of motion using special light, and implement an appropriate noise reduction process by calculating a normal light motion vector from a plurality of normal light images, and calculating a special light motion vector of a special light image based on the normal light motion vector.

According to one embodiment of the invention, there is provided an image processing device comprising:

a normal light image acquisition section that acquires a normal light image, the normal light image being an image that includes information within a wavelength band of white light;

a special light image acquisition section that acquires a special light image, the special light image being an image that includes information within a specific wavelength band;

a normal light motion vector information calculation section that calculates normal light motion vector information based on a feature quantity included in the normal light image, the normal light motion vector information indicating a motion vector between a plurality of normal light images; and a noise reduction section that reduces an amount of noise included in the special light image based on the normal light motion vector information calculated by the normal light motion vector information calculation section.

According to the above configuration, the normal light image and the special light image are acquired, and the normal light motion vector information is calculated from the normal light image. The amount of noise included in the special light image is reduced using the calculated normal light motion vector information. This makes it possible to calculate more accurate motion vector information using the normal light image that is brighter than the special light image. Therefore, noise can be efficiently reduced when using a frame-cyclic noise reduction process, for example.

According to another embodiment of the invention, there is provided an information storage medium storing a program that causes a computer to function as:

a normal light image acquisition section that acquires a normal light image, the normal light image being an image that includes information within a wavelength band of white light;

a special light image acquisition section that acquires a special light image, the special light image being an image that includes information within a specific wavelength band;

a normal light motion vector information calculation section that calculates normal light motion vector information based on a feature quantity included in the normal light image, the normal light motion vector information indicating a motion vector between a plurality of normal light images; and a noise reduction section that reduces an amount of noise included in the special light image based on the normal light motion vector information calculated by the normal light motion vector information calculation section.

Exemplary embodiments of the invention are described below. Note that the following exemplary embodiments do not in any way limit the scope of the invention laid out in the claims. Note that all elements of the following exemplary embodiments should not necessarily be taken as essential requirements for the invention.

1. Method

A method according to one embodiment of the invention is described below. A frame-cyclic noise reduction process is known as a method that reduces a noise component included in a video image signal. The frame-cyclic noise reduction process utilizes three-dimensional noise removal (i.e., noise removal that uses images in different frames).

Since the frame-cyclic noise reduction process removes noise based on information about the corresponding pixels in different frames, the noise reduction process can be performed without a problem based on the information about the corresponding pixels when the object is stationary. However, a residual image may occur in the image after noise removal when the object moves. Therefore, it is necessary to accurately calculate (determine) the moving amount (amount of motion) of the object in order to effectively reduce noise.

However, when applying the above noise reduction process to an endoscope system that acquires a special light image (i.e., an image that includes information corresponding to narrow-band light) in addition to a normal light image, a problem may occur when reducing noise included in the special light image. Specifically, since the special light image is acquired using narrow-band light, the special light image is darker than the normal light image, and is significantly affected by a noise component. This makes it difficult to accurately calculate the amount of motion.

Figure 3:
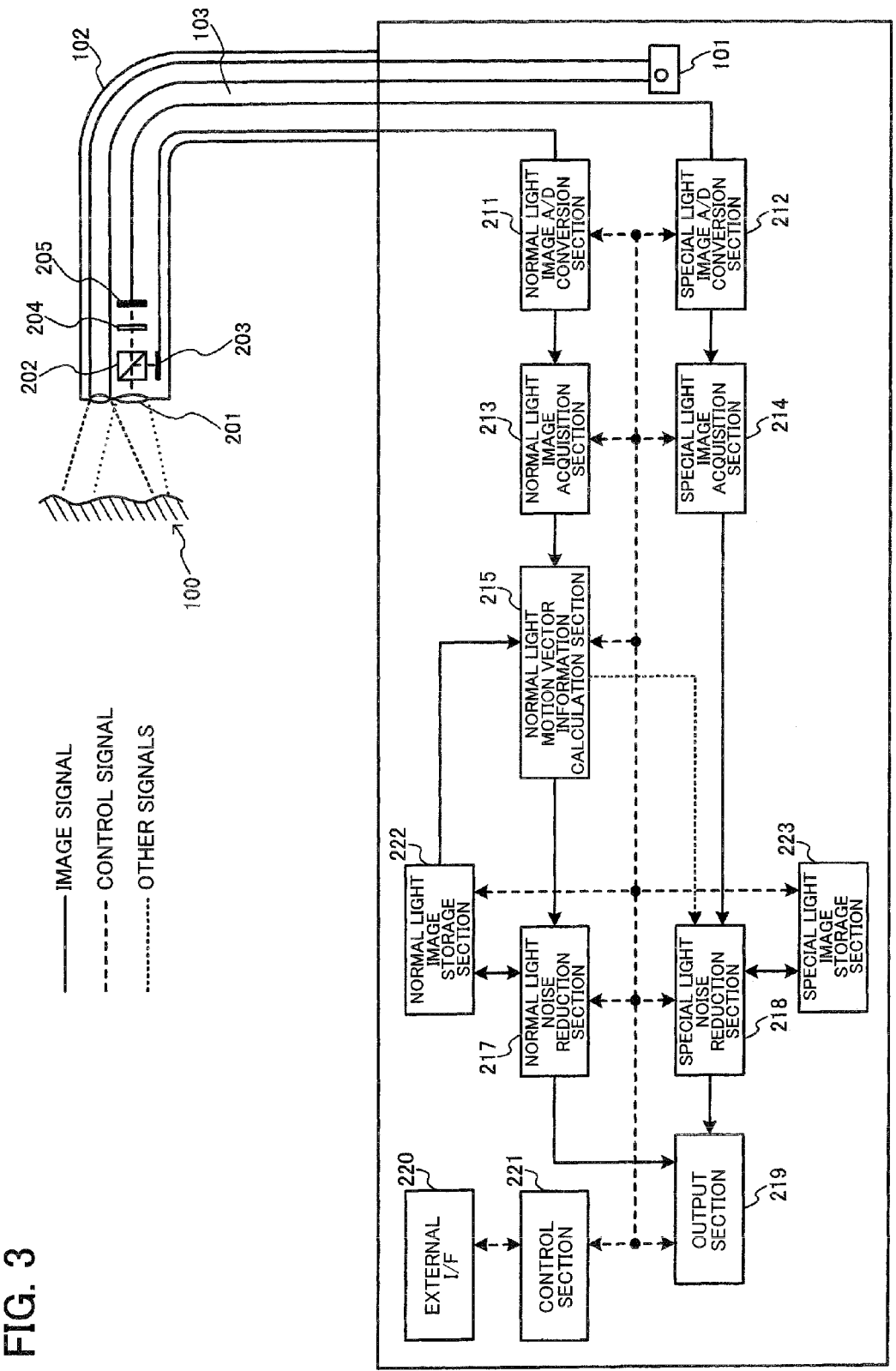
FIG. 3 shows a configuration example of an endoscope system that includes an image processing device according to the first embodiment.

The present application proposes a method that calculates the amount of motion (motion vector) in the special light image by utilizing information about the normal light image. As shown in FIG. 1, when the normal light image and the special light image can be acquired at the same time (e.g., a configuration using two imaging elements as shown in FIG. 3), a normal light motion vector VA1 (i.e., the motion vector of the normal light image) is acquired from the preceding-frame normal light image (e.g., A1 in FIG. 1) and the current-frame normal light image (e.g., A2 in FIG. 1). Since the preceding-frame special light image A3 is captured at the same time as the normal light image A1, and the current-frame special light image A4 is captured at the same time as the normal light image A2, the calculation target special light motion vector VA2 basically coincides with the normal light motion vector VA1. Therefore, the special light motion vector VA2 can be more accurately calculated by calculating the normal light motion vector VA1 using the normal light image that is brighter than the special light image instead of directly calculating the special light motion vector VA2.

Figure 14:
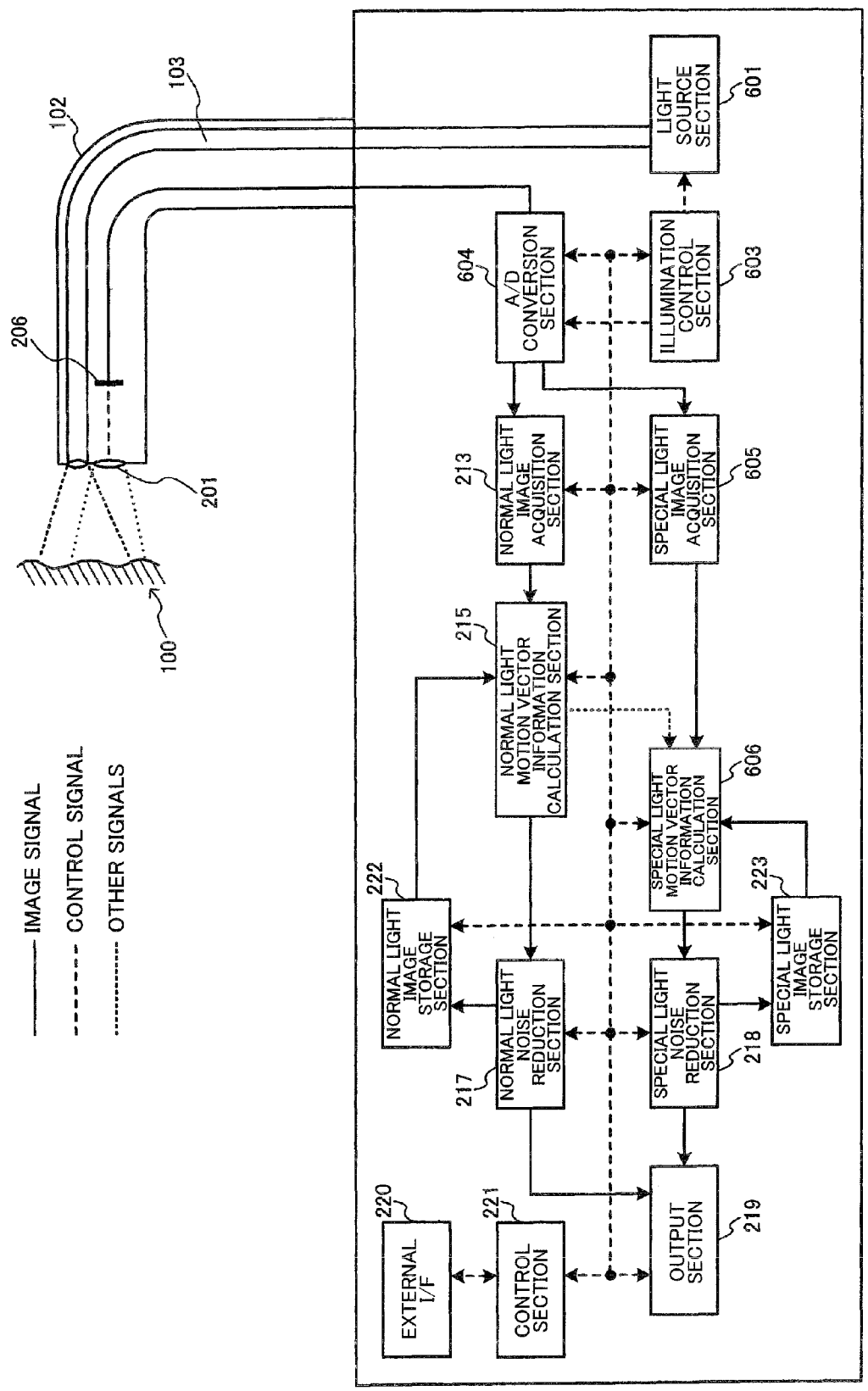
FIG. 14 shows a configuration example of an endoscope system that includes an image processing device according to the second embodiment.

The above basic method is described below in connection with a first embodiment. A second embodiment illustrates an example of a configuration in which the normal light image and the special light image are alternately acquired (e.g., a configuration using a single imaging element as shown in FIG. 14) (see FIG. 2). In this case, when calculating a special light motion vector VB3 between special light images B4 and B5, a motion vector VB1 between normal light images B1 and B2 and a motion vector VB2 between the normal light images B2 and B3 are calculated, and the motion vectors VB1 and VB2 are appropriately blended (e.g., averaged).

This makes it possible to calculate the special light motion vector using the bright normal light image that includes a small amount of noise instead of directly using the dark special light image that includes a large amount of noise. Therefore, the amount of motion of the object in the special light image can be accurately calculated, so that noise can be effectively reduced when using the frame-cyclic noise reduction process.

2. First Embodiment

FIG. 3 is a view showing the configuration of an endoscope system that includes an image processing device according to a first embodiment of the invention. The endoscope system includes a normal light source 101, an insertion section 102, a light guide 103, a lens 201, a half mirror 202, a normal light imaging element 203, a filter 204, a special light imaging element 205, a normal light image A/D conversion section 211, a special light image A/D conversion section 212, a normal light image acquisition section 213, a special light image acquisition section 214, a normal light motion vector information calculation section 215, a normal light noise reduction section 217, a special light noise reduction section 218, an output section 219, an external I/F 220, a control section 221, a normal light image storage section 222, and a special light image storage section 223. Note that the configuration of the endoscope system is not limited to the configuration shown in FIG. 3. Various modifications may be made, such as omitting some of the elements shown in FIG. 3.

Since the image processing device is applied to an endoscope, the insertion section 102 is formed to be elongated and flexible (i.e., can be curved) so that the insertion section 102 can be inserted into a body. Light emitted from the normal light source 101 is applied to an object 100 via the light guide 103 that can be curved. The lens 201 is disposed on the end of the insertion section 102. Reflected light from the object 100 enters the lens 201, and is separated into two rays of reflected light by the half mirror 202.

One of the two rays of reflected light enters the normal light imaging element 203. The normal light imaging element 203 includes a Bayer color filter array that is used to form a normal light image. The normal light imaging element 203 includes a color filter having RGB spectral characteristics shown in FIG. 4 (R (580 to 700 nm), G (480 to 600 nm), B (400 to 500 nm)). The normal light imaging element 203 converts the reflected light into a normal light analog image signal via photoelectric conversion.

The other of the two rays of reflected light enters the special light imaging element 205 that includes a narrow-band color filter. The special light imaging element 205 has given narrow-band transmittance characteristics shown in FIG. 5 (G1 (530 to 550 nm), B1 (390 to 445 nm)). The special light imaging element 205 includes two types of color filters disposed in a staggered arrangement to form a special light image (see FIG. 6). The special light imaging element 205 converts narrow-band light into a special light analog image signal (NBI image signal) via photoelectric conversion. In the field of endoscopic diagnosis, light having the above narrow-band spectral characteristics is easily absorbed by hemoglobin in blood, so that capillaries and a minute mucous membrane pattern in the mucous membrane surface layer can be enhanced. The NBI image signal is effective for diagnosis of esophagus cancer, large bowel cancer, stomach cancer, and the like.

The normal light analog image signal obtained by the normal light imaging element 203 is output to the normal light image A/D conversion section 211, and the special light analog image signal obtained by the special light imaging element 205 is output to the special light image A/D conversion section 212.

The normal light image A/D conversion section 211 is connected to the output section 219 via the normal light image acquisition section 213, the normal light motion vector information calculation section 215, and the normal light noise reduction section 217. The normal light noise reduction section 217 is bidirectionally connected to the normal light image storage section 222. The normal light image storage section 222 is connected to the normal light motion vector information calculation section 215. The special light image A/D conversion section 212 is connected to the output section 219 via the special light image acquisition section 214 and the special light noise reduction section 218. The special light noise reduction section 218 is bidirectionally connected to the special light image storage section 223. The normal light motion vector information calculation section 215 is connected to the special light noise reduction section 218. The control section 221 is bidirectionally connected to the normal light image A/D conversion section 211, the special light image A/D conversion section 212, the normal light image acquisition section 213, the special light image acquisition section 214, the normal light motion vector information calculation section 215, the normal light noise reduction section 217, the special light noise reduction section 218, the output section 219, the normal light image storage section 222, and the special light image storage section 223. The external I/F 220 is connected to the control section 221.

The normal light image A/D conversion section 211 digitizes the normal light analog image signal from the normal light imaging element 203 to obtain a normal light digital image signal (hereinafter referred to as "normal light image signal"), and transmits the normal light image signal to the normal light image acquisition section 213. The special light image A/D conversion section 212 digitizes the special light analog image signal from the special light imaging element 205 to obtain a special light digital image signal (hereinafter referred to as "special light image signal"), and transmits the special light image signal to the special light image acquisition section 214.

The normal light image acquisition section 213 performs an image process on the normal light image signal from the normal light image A/D conversion section 211 under control of the control section 221. Specifically, the normal light image acquisition section 213 performs a Bayer interpolation process (i.e., a process that converts a Bayer image signal into an RGB image signal), a white balance process, a color management process, a grayscale transformation process, and the like. The normal light image acquisition section 213 transmits the resulting normal light image signal (RGB signal) to the normal light motion vector information calculation section 215.

The special light image acquisition section 214 performs an image process on the special light image signal from the special light image A/D conversion section 217 under control of the control section 221. Specifically, the special light image acquisition section 214 performs a missing pixel interpolation process using the special light image signal generated by the special light imaging element that includes two types of color filters G1 and B1 disposed in a staggered arrangement (see FIG. 6). More specifically, the special light image acquisition section 214 calculates the average signal value of the peripheral pixels of the missing pixel of the same color filter, and interpolates the missing pixel with the resulting signal value. For example, the pixels G1(1, 1) and B1(2, 1) shown in FIG. 6 are calculated using the following expressions (1).

$$G1(1,1)=(G1(1,0)+G1(0,1)+G1(2,1)+G1(1,2))/4$$

$$B1(2,1)=(B1(2,0)+B1(1,1)+B1(3,1)+B1(2,2))/4 \quad (1)$$

The image signals (G1, B1) of each pixel are generated by the above interpolation process. An NBI special light image (NBI pseudo-color image) is then generated using the following expressions (2).

$$Rch\_v(x,y)=p1*G1(x,y)$$

$$Gch\_v(x,y)=p2*B1(x,y)$$

$$Bch\_v(x,y)=p3*B1(x,y) \quad (2)$$

where, Rch_v(x, y) is the signal value of the R channel of the NBI special light image signal, Gch_v(x, y) is the signal value of the G channel of the NBI special light image signal, Bch_v (x, y) is the signal value of the B channel of the NBI special light image signal, B1(x, y) is the pixel value of the B1 (narrow-band) image of the image signals (G1, B1) of each pixel after the interpolation process, G1(x, y) is the pixel value of the G1 (narrow-band) image of the image signals (G1, B1) of each pixel after the interpolation process, (x, y) are the coordinates of each pixel along the horizontal axis and the vertical axis, and p1, p2, and p3 are given coefficients.

The special light image acquisition section 214 then performs a grayscale transformation process and the like on the NBI special light image signal The special light image acquisition section 214 transmits the resulting special light image signal (Rch_v, Gch_v, Bch_v) (RGB signal) to the special light noise reduction section 218.

Figure 7:
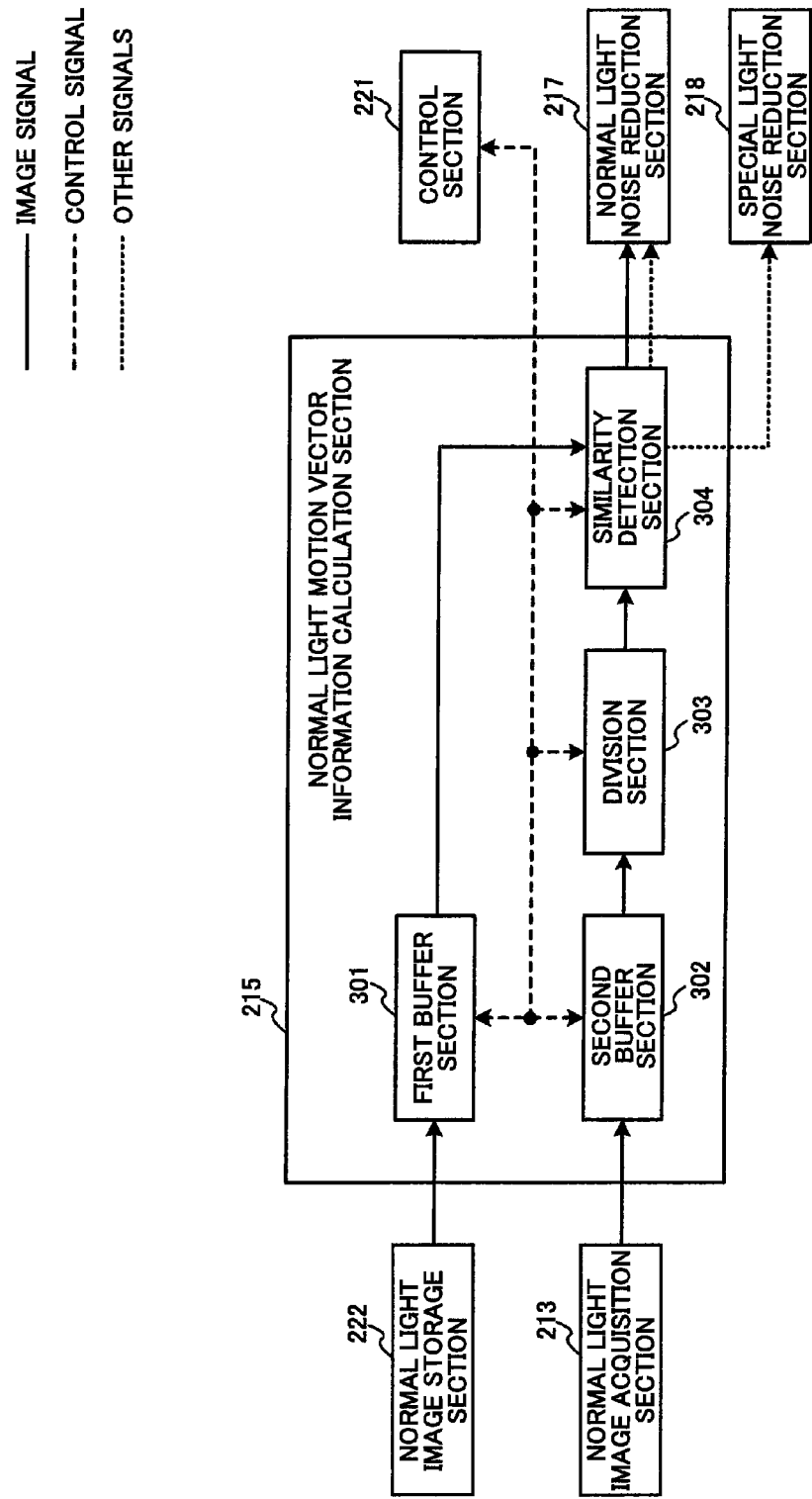
FIG. 7 shows a configuration example of a normal light motion vector information calculation section.

FIG. 7 shows an example of the configuration of the normal light motion vector information calculation section 215. The normal light motion vector information calculation section 215 includes a first buffer section 301, a second buffer section 302, a division section 303, a similarity detection section 304. The normal light image acquisition section 213 is connected to the normal light noise reduction section 217 and the special light noise reduction section 218 via the second buffer section 302, the division section 303, and the similarity detection section 304. The normal light image storage section 222 is connected to the similarity detection section 304 via the first buffer section 301. The control section 221 is bidirectionally connected to the first buffer section 301, the second buffer section 302, the division section 303, and the similarity detection section 304.

The normal light image acquisition section 213 transmits (temporarily stores) the normal light image signal subjected to the image process to (in) the second buffer section 302 under control of the control section 221.

The normal light image storage section 222 transmits (temporarily stores) the preceding normal light image signal that has been stored therein and reduced in noise to (in) the first buffer section 301 under control of the control section 221. The preceding normal light image signal refers to a normal light image signal that has been captured immediately before the normal light image signal stored in the second buffer section 302. The preceding normal light image signal stored in the first buffer section 301 is hereinafter referred to as "preceding-frame normal light image signal", and the normal light image signal stored in the second buffer section 302 is hereinafter referred to as "current-frame normal light image signal".

The division section 303 reads and divides the current-frame normal light image signal stored in the second buffer section 302 under control of the control section 221. Specifically, the division section 303 divides the current-frame normal light image signal into a plurality of block areas using a given size. For example, the division section 303 divides the current-frame normal light image signal into a plurality of rectangular areas having the given size M×N (e.g., 8×8, 16×16, or 32×32). The division section 303 transmits the current-frame normal light image signal corresponding to each block area to the similarity detection section 304. Note that the division section 303 may divide the current-frame normal light image signal into a plurality of block areas having a polygonal shape other than a rectangular shape. The user may optionally designate the shape of the block areas via the external I/F 220.

The similarity detection section 304 performs a template matching process on the preceding-frame normal light image signal that has been transmitted from the first buffer section 301 and reduced in noise using the normal light image signal corresponding to each block area of the current-frame normal light image signal from the division section 303 under control of the control section 221, and detects the block area having the highest degree of similarity. Specifically, the similarity detection section 304 performs a known template matching process in raster scan order using the normal light image signal corresponding to each block area of the current-frame normal light image signal, and extracts the corresponding processing target block area of the preceding-frame normal light image signal. The difference in coordinates (U, V) between the processing target block area of the preceding-frame normal light image signal and the processing target block area of the current-frame normal light image signal is used as normal light motion vector information.

After the matching process has been performed on all of the block areas of the current-frame image signal (template), the similarity detection section 304 transmits the normal light motion vector information and the current-frame normal light image signal to the normal light noise reduction section 217. The similarity detection section 304 also transmits the normal light motion vector information to the special light noise reduction section 218.

Figure 8:
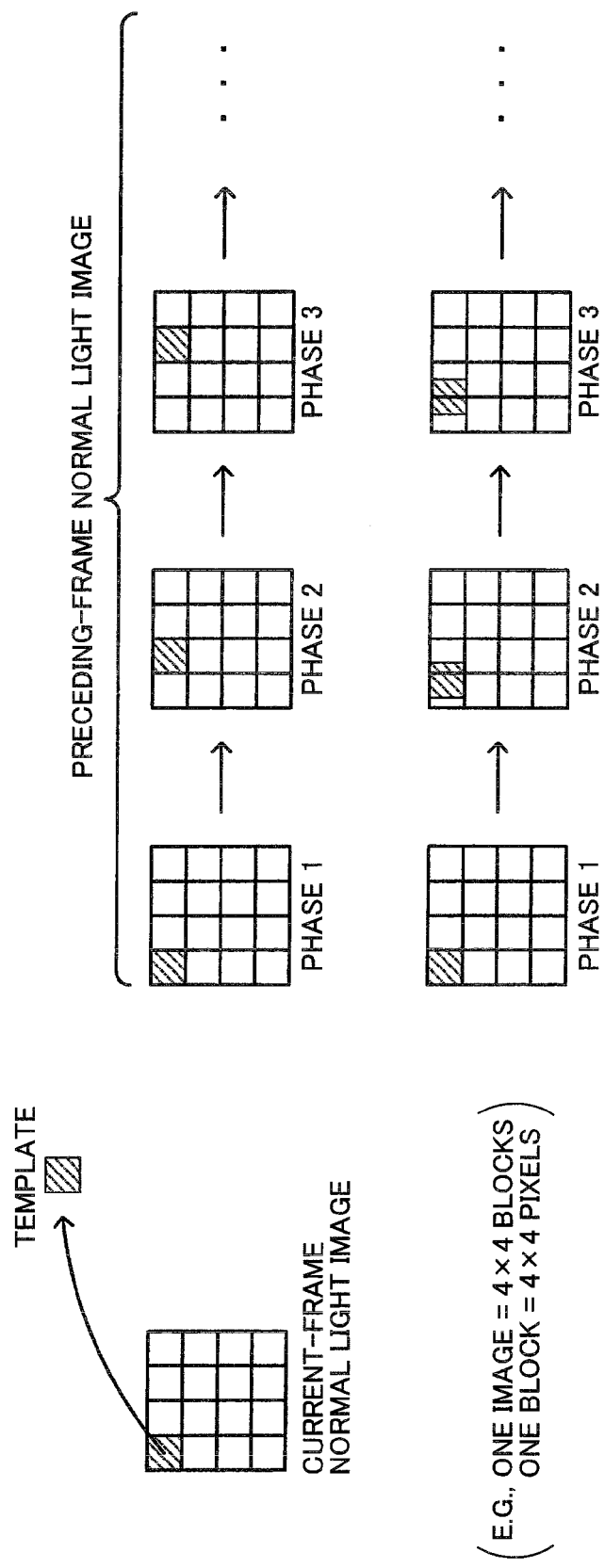
FIG. 8 is a view illustrative of a matching process on a current-frame normal light image and a preceding-frame normal light image.

In the first embodiment, the preceding-frame normal light image signal is also divided into a plurality of block areas, and the template matching process is performed on each block area (see the upper area in FIG. 8). Note that another configuration may also be employed. For example, a block matching process may be performed in pixel units (see the upper area in FIG. 8). For example, the similarity detection section 304 performs a known template matching process using the normal light image signal corresponding to the block area that is positioned around the processing target pixel and has a given size, and extracts the corresponding processing target block area of the preceding-frame normal light image signal. The similarity detection section 304 then determines the difference in coordinates between the processing target pixel and the pixel positioned at the center of the processing target block area of the preceding-frame normal light image signal to be the normal light motion vector information. This improves the matching accuracy.

The normal light noise reduction section 217 performs a noise reduction process on a luminance signal based on the matching results (normal light motion vector) under control of the control section 221. A method of reducing noise from the normal light image signal using the normal light motion vector is known in the art. Therefore, detailed description thereof is omitted. Since the normal light noise reduction section 217 converts the RGB signal into a luminance signal and a color difference signal using a known conversion expression, the normal light noise reduction section 217 also performs the noise reduction process on the color difference signal in the same manner as the luminance signal.

In the first embodiment, the normal light motion vector information is calculated using the luminance signal as the feature quantity. Note that the Gch_v image signal (i.e., a signal having the G spectral characteristics shown in FIG. 4) subjected to the interpolation process (see the expression (2)) may also be used.

The noise reduction process performed by the special light noise reduction section 218 on the special light image signal is described below. In the first embodiment, the normal light image signal and the special light image signal have the same resolution (image size). Therefore, the normal light motion vector information from the normal light motion vector information calculation section 215 may be transmitted to the special light noise reduction section 218 as special light motion vector information, and the noise reduction process may be performed on the special light image signal using the same internal configuration as that of the normal light noise reduction section 217 under control of the control section 221.

In this case, the special light noise reduction section 218 calculates the differential value (similarity differential value) of each pixel of the current-frame special light image signal with respect to the preceding-frame special light image signal that has been transmitted from the special light image storage section 223 and reduced in noise, based on the normal light motion vector information from the normal light motion vector information calculation section 215. The special light noise reduction section 218 then calculates the amount of noise of each pixel using the following expressions (3) based on the similarity differential value by utilizing a special light noise model shown in FIG. 9, and performs the noise reduction process using the following expressions (4).

$$S(x,y)=C(x,y)-B(x,y)$$

$$\text{If}(|S(x,y)|<S(T))NS(x,y)=|S(x,y)|*Ka$$

$$\text{Else } NS(x,y)=NS(T) \quad (3)$$

where, $C(x, y)$ is the pixel signal value in the processing target block area of the preceding-frame special light image signal, $B(x, y)$ is the pixel signal value in the processing target block area of the current-frame special light image signal, $S(x, y)$ is the similarity differential value of each pixel (i.e., the differential value of each corresponding pixel of the processing target block area of the preceding-frame special light image signal and the processing target block area of the current-frame special light image signal), $NS(x, y)$ is the amount of noise of the processing target pixel, Ka is the slope coefficient of the similarity differential value and the noise component, $S(T)$ is the similarity difference threshold value, $NS(T)$ is the noise threshold value, and $S(Max)$ is the maximum similar difference value.

Since the similarity differential value $S(x, y)$ is the differential value between the preceding-frame special light image signal (from which noise has been removed) and the current-frame special light image signal (from which noise has not been removed) taking account of the motion vector, the similarity differential value $S(x, y)$ ideally indicates the noise value included in the current-frame special light image signal. However, since the entire noise has not been removed from the preceding-frame special light image signal, and a change in value occurs due to other factors (e.g., a change in illumination or deformation of the object), the similarity differential value $S(x, y)$ cannot be used directly as the noise value NS $(x, y)$.

Figure 9:
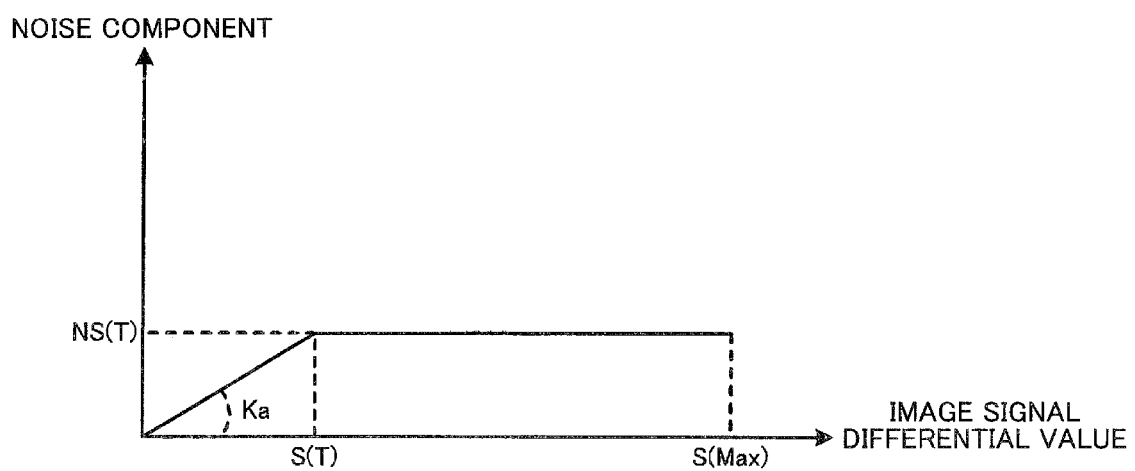
FIG. 9 shows an example of a special light noise model.

Therefore, the special light noise model shown in FIG. 9 is used. The special light noise model shown in FIG. 9 indicates the relationship between the similarity differential value and the amount of noise included in the similarity differential value. When the similarity differential value is equal to or less than a given threshold value $S(T)$, the amount of noise increases linearly. When the similarity differential value is larger than the threshold value $S(T)$, the amount of noise has a constant value $NS(T)$. The components the similarity differential value other than noise may include a component due to deformation of the object, a component due to a change in light source, and the like.

When the amount of noise has been determined, the noise reduction process is performed using the following expressions (4).

$$\text{If}(S(x,y)>0)E'(x,y)=B(x,y)+NS(x,y)$$

$$\text{Else } E'(x,y)=B(x,y)-NS(x,y) \quad (4)$$

where, $E'(x, y)$ is the special light image signal value after the noise reduction process.

Since $S(x, y)$=preceding frame−current frame, preceding frame>current frame when $S(x, y)>0$. Therefore, it is likely that negative noise is included in the current frame. Therefore, the noise value $NS(x, y)$ calculated using the expressions (3) is added to the current-frame special light image signal $B(x, y)$. Since preceding frame≤current frame when $S(x, y)<0$, it is likely that positive noise is included in the current frame. Therefore, the noise value $NS(x, y)$ is subtracted from the current-frame special light image signal $B(x, y)$.

The noise reduction process can thus be moderately performed on the special light image (current-frame special light image signal).

However, the special light image signal and the normal light image signal normally differ in resolution. In this case, the normal light motion vector information calculated from the normal light image signal as described above cannot be applied directly to the noise reduction process on the special light image signal.

Figure 10:
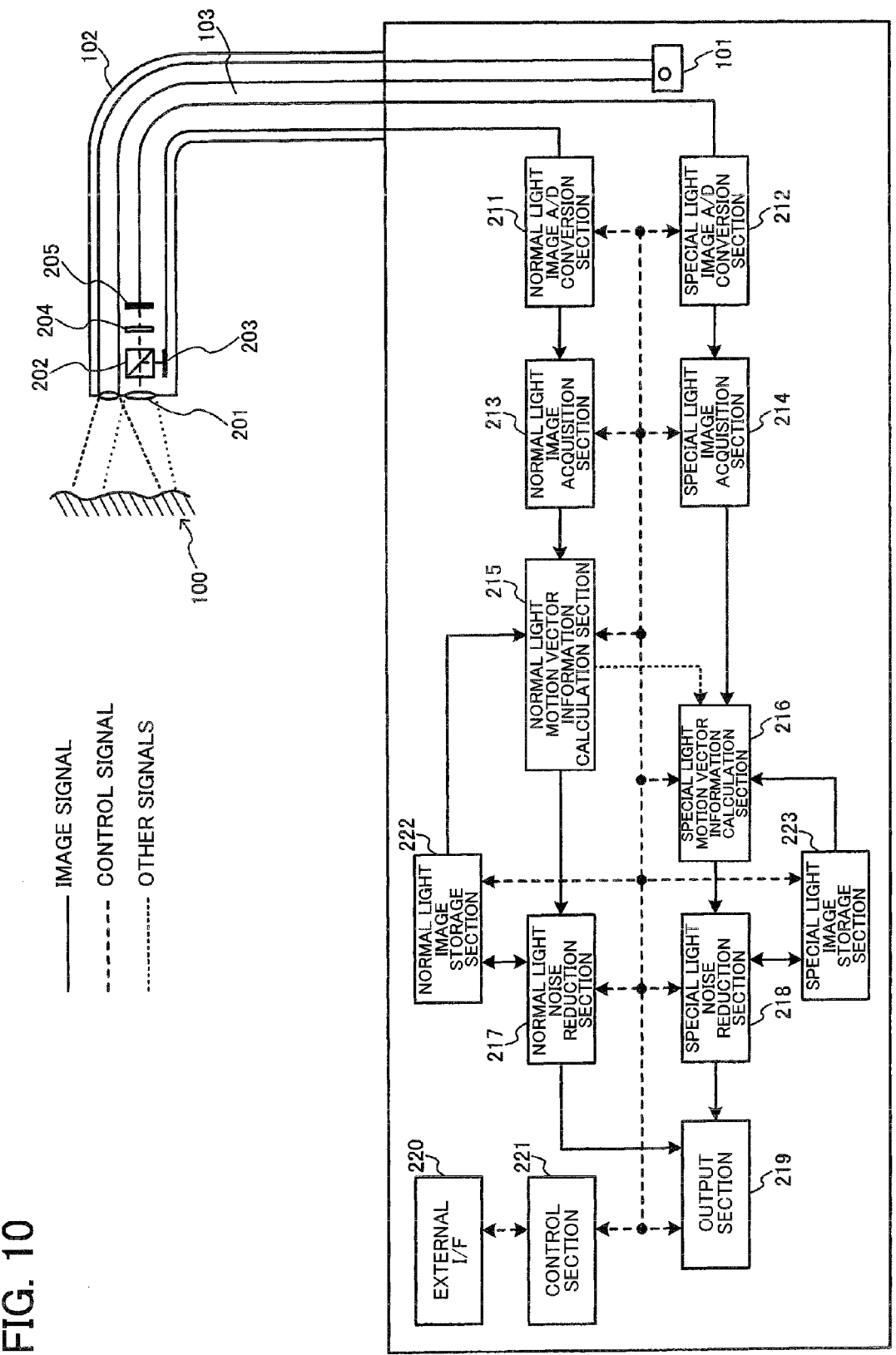
FIG. 10 shows another configuration example of an endoscope system that includes an image processing device according to the first embodiment.

FIG. 10 is a view showing the configuration of a modification of the first embodiment. An endoscope system according to the modification includes a normal light source 101, an insertion section 102, a light guide 103, a lens 201, a half mirror 202, a normal light imaging element 203, a filter 204, a special light imaging element 205, a normal light image A/D conversion section 211, a special light image A/D conversion section 212, a normal light image acquisition section 213, a special light image acquisition section 214, a normal light motion vector information calculation section 215, a special light motion vector information calculation section 216, a normal light noise reduction section 217, a special light noise reduction section 218, an output section 219, an external I/F 220, a control section 221, a normal light image storage section 222, and a special light image storage section 223.

The normal light analog image signal obtained by the normal light imaging element 203 is output to the normal light image A/D conversion section 211, and the special light analog image signal obtained by the special light imaging element 205 is output to the special light image A/D conversion section 212.

The normal light image A/D conversion section 211 is connected to the output section 219 via the normal light image acquisition section 213, the normal light motion vector information calculation section 215, and the normal light noise reduction section 217. The normal light noise reduction section 217 is bidirectionally connected to the normal light image storage section 222. The normal light image storage section 222 is connected to the normal light motion vector information calculation section 215. The special light image A/D conversion section 212 is connected to the output section 219 via the special light image acquisition section 214, the special light motion vector information calculation section 216, and the special light noise reduction section 218. The special light noise reduction section 218 is bidirectionally connected to the special light image storage section 223. The special light image storage section 223 is connected to the special light motion vector information calculation section 216. The normal light motion vector information calculation section 215 is connected to the special light motion vector information calculation section 216. The control section 221 is bidirectionally connected to the normal light image A/D conversion section 211, the special light image A/D conversion section 212, the normal light image acquisition section 213, the special light image acquisition section 214, the normal light motion vector information calculation section 215, the special light motion vector information calculation section 216, the normal light noise reduction section 217, the special light noise reduction section 218, the output section 219, the normal light image storage section 222, and the special light image storage section 223. The external I/F 220 is connected to the control section 221.

The following description focuses on the difference between the modification and the first embodiment.

In the modification, the normal light motion vector information from the normal light motion vector information calculation section 215 and the image size (I, J) of the normal light image signal are transmitted to the special light motion vector information calculation section 216 under control of the control section 221.

The motion vector calculated from the normal light image signal is corrected based on resolution comparison information about the special light image signal and the normal light image signal to obtain a special light motion vector, and the noise reduction process is performed on the special light image signal.

Figure 11:
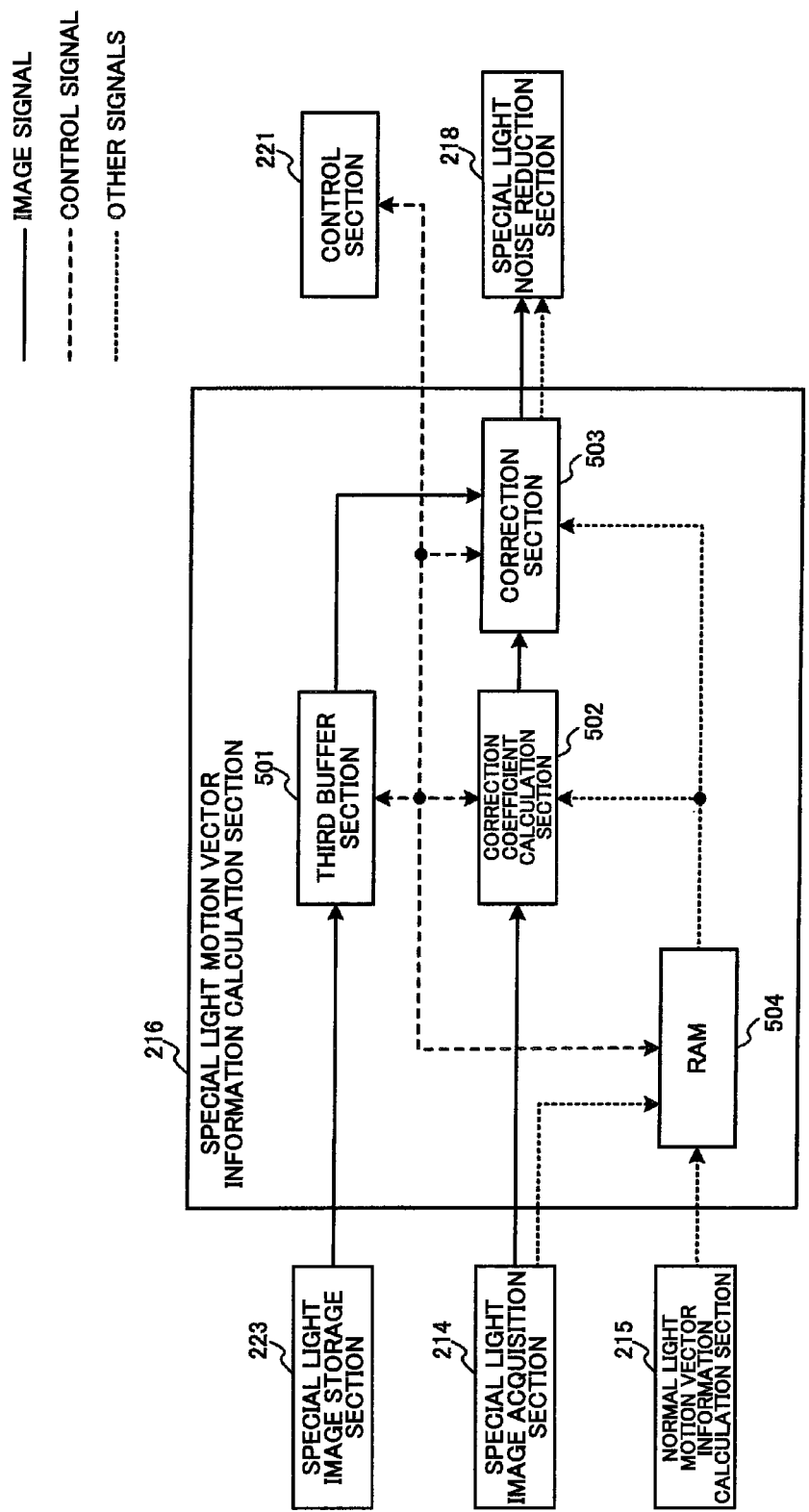
FIG. 11 shows a configuration example of a special light motion vector information calculation section.

FIG. 11 shows an example of the configuration of the special light motion vector information calculation section 216. The special light motion vector information calculation section 216 includes a third buffer section 501, a correction coefficient calculation section 502, a correction section 503, and a RAM 504. The special light image acquisition section 214 is connected to the special light noise reduction section 218 via the correction coefficient calculation section 502 and the correction section 503. The normal light motion vector information calculation section 215 is connected to the correction coefficient calculation section 502 and the correction section 503 via the RAM 504. The special light image storage section 223 is connected to the correction section 503 via the third buffer section 501. The normal light motion vector information calculation section 215 is connected to the RAM 504. The control section 221 is bidirectionally connected to the third buffer section 501, the correction coefficient calculation section 502, the correction section 503, and the RAM 504.

The special light image acquisition section 214 transmits (temporarily stores) the special light image signal subjected to the image process to (in) the correction coefficient calculation section 502, and transmits (temporarily stores) the image size (K, L) of the special light image signal to (in) the RAM 504 Wider control of the control section 221. The normal light motion vector information from the normal light motion vector information calculation section 215 and the image size (I, J) of the normal light image signal are also transmitted (temporarily stored) to (in) the RAM 504.

The special light image storage section 223 transmits (temporarily stores) the preceding special light image signal that has been stored therein and reduced in noise to (in) the third buffer section 501 under control of the control section 221. The preceding special light image signal refers to a special light image signal that has been captured immediately before the special light image signal from the special light image acquisition section 214. The preceding special light image signal stored in the third buffer section 501 is hereinafter referred to as "preceding-frame special light image signal", and the special light image signal from the special light image acquisition section 214 is hereinafter referred to as "current-frame special light image signal".

The correction coefficient calculation section 502 calculates correction coefficients by the following expressions (5) using the image size (I, J) of the normal light image signal from the RAM 504 and the image size (K, L) of the special image signal from the special light image acquisition section 214, and transmits the correction coefficients to the correction section 503 together with the current-frame special light image signal under control of the control section 221.

$$PowerX = K/I$$

$$PowerY = L/J \quad (5)$$

The correction section 503 calculates the special light motion vector by the following expressions (6) based on the normal light motion vector information from the RAM 504 using the correction coefficients PowerX and PowerY calculated by the expressions (5) under control of the control section 221.

$$u = U * PowerX$$

$$v = V * PowerY \quad (6)$$

Note that (u, v) is the motion vector (special light motion vector information) corresponding to one block area of the special light image signal, and (U, V) is the motion vector (normal light motion vector information) of the block area of the normal light image signal corresponding to the block area of the special light image signal.

After the special light motion vector of each block area of the special light image signal has been calculated, the special light motion vector is transmitted to the special light noise reduction section 218.

The special light noise reduction section 218 performs the special light noise reduction process using the current-frame special light image signal, the preceding-frame special light image signal, and the motion vector information about the block area of the special light image signal under control of the control section 221. The configuration of the special light noise reduction process is the same as that of the first embodiment. Therefore, description thereof is omitted.

Since the normal light motion vector can be calculated from the normal light image signal, the special light motion vector can be acquired after correcting the normal light motion vector, and the noise reduction process can be performed using the special light motion vector, the noise reduction effect on the special light image signal can be improved. This makes it possible to improve the diagnostic capability using the special light image signal.

An example in which the image signal process is implemented by hardware has been described above. Note that the configuration according to the first embodiment is not limited thereto. For example, the image signal obtained by the A/D conversion process may be recorded in a recording medium (e.g., memory card) as RAW data, and the capturing information (e.g., AGC sensitivity and white balance coefficient) from the control section 221 may be recorded in the recording medium as header information. A computer may be caused to execute an image signal processing program (software) to read and process the information recorded in the recording medium. The information may be transferred from the imaging section to the computer via a communication channel or the like instead of using the recording medium.

Figure 12:
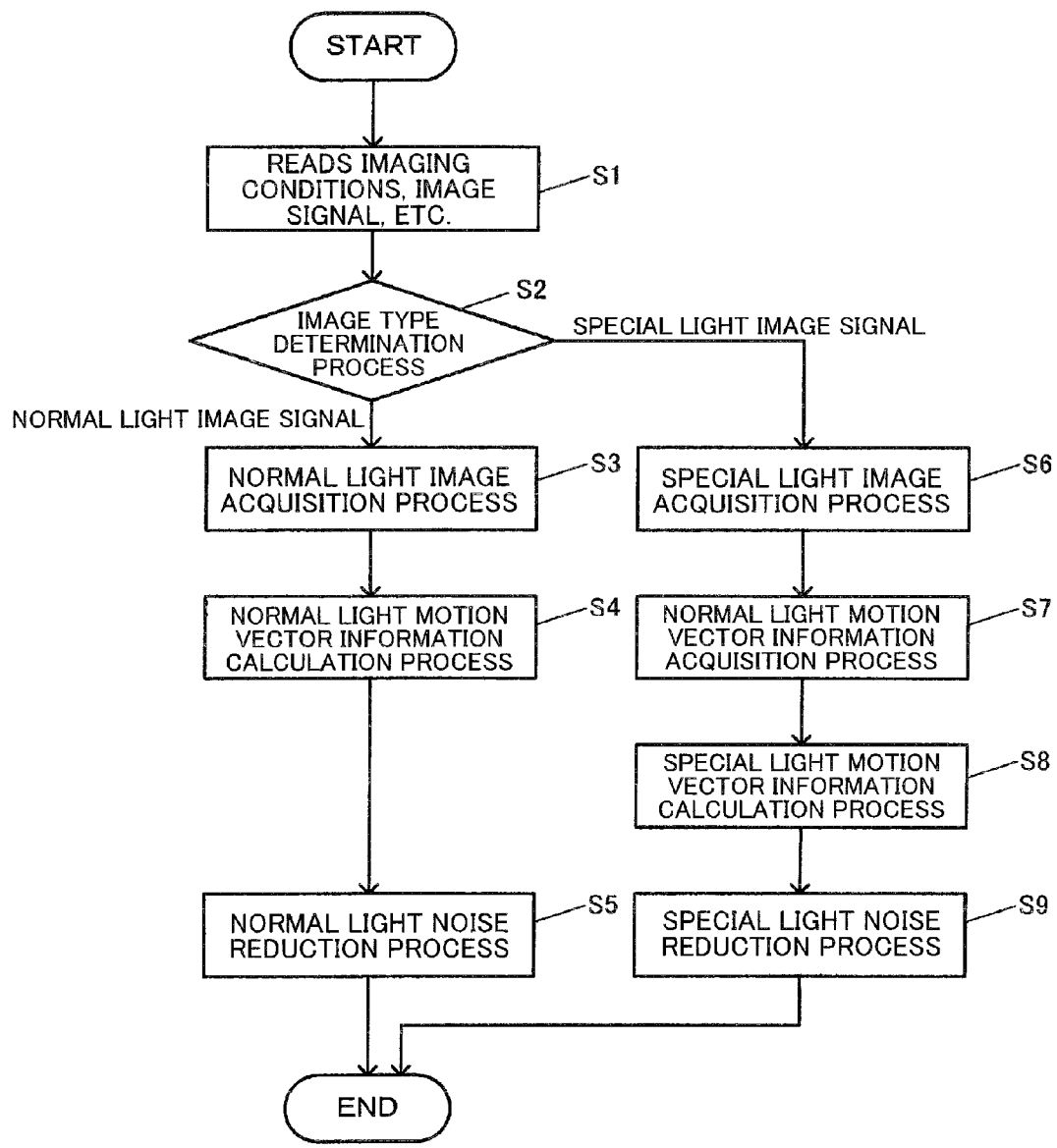
FIG. 12 is a flowchart illustrative of a process according to the first embodiment.

FIG. 12 is a flowchart showing the process performed based on an image signal processing program according to the first embodiment.

The raw data about the normal light image signal and the special light image signal, the header information including the size of the image signal, and information about a grayscale characteristic coefficient and the like provided in the image signal processing program are read in a step S1. The header information and the information about the grayscale characteristic coefficient and the like are temporarily stored in the memory. This process corresponds to the process in which the image processing device (imaging apparatus) acquires the normal light image signal and the special light image signal obtained by capturing the object.

The type of the read image signal is determined in a step S2. When the image signal is the normal light image signal, a transition to a step S3 occurs. When the image signal is the special light image signal, a transition to a step S6 occurs. In the step S3, a Bayer interpolation process (i.e., a process that converts a Bayer image signal into an RGB image signal), a white balance process, a color management process, a grayscale transformation process, and the like are performed on the normal light image signal. A transition to a step S4 then occurs. The step S3 corresponds to the process of the normal light image acquisition section 213 shown in FIG. 3.

In the step S4, the normal light motion vector information is calculated using the preceding-frame normal light image signal and the current-frame normal light image signal. The normal light motion vector information is temporarily stored in the memory. A transition to a step S5 then occurs. The step S4 corresponds to the process of the normal light motion vector information calculation section 215 shown in FIG. 3. In the step S5, the normal light noise reduction process is performed using the normal light image signal and the normal light motion vector information. The normal light image signal subjected to the noise reduction process is stored in the memory. The step S5 corresponds to the process of the normal light noise reduction section 217 shown in FIG. 3.

In the step S6, the image process is performed on the special light image signal. Since the special light image signal has a staggered arrangement (G1 and B1) shown in FIG. 6, the interpolation process is performed based on the expressions (1) and (2), and a known grayscale transformation process and the like are performed. A transition to a step S7 then occurs. The step S6 corresponds to the process of the special light image acquisition section 214 shown in FIG. 3. In the step S7, the normal light motion vector information is read from the memory. A transition to a step S8 then occurs. In the step S8, the special light motion vector is calculated using the normal light motion vector information. A transition to a step S9 then occurs. The step S8 corresponds to the process of the special light motion vector information calculation section 216 shown in FIG. 10.

In the step S9, the special light noise reduction process is performed using the special light image signal and the special light motion vector information. The special light image signal subjected to the noise reduction process is stored in the memory. The step S9 corresponds to the process of the special light noise reduction section 218 shown in FIG. 3.

Figure 13:
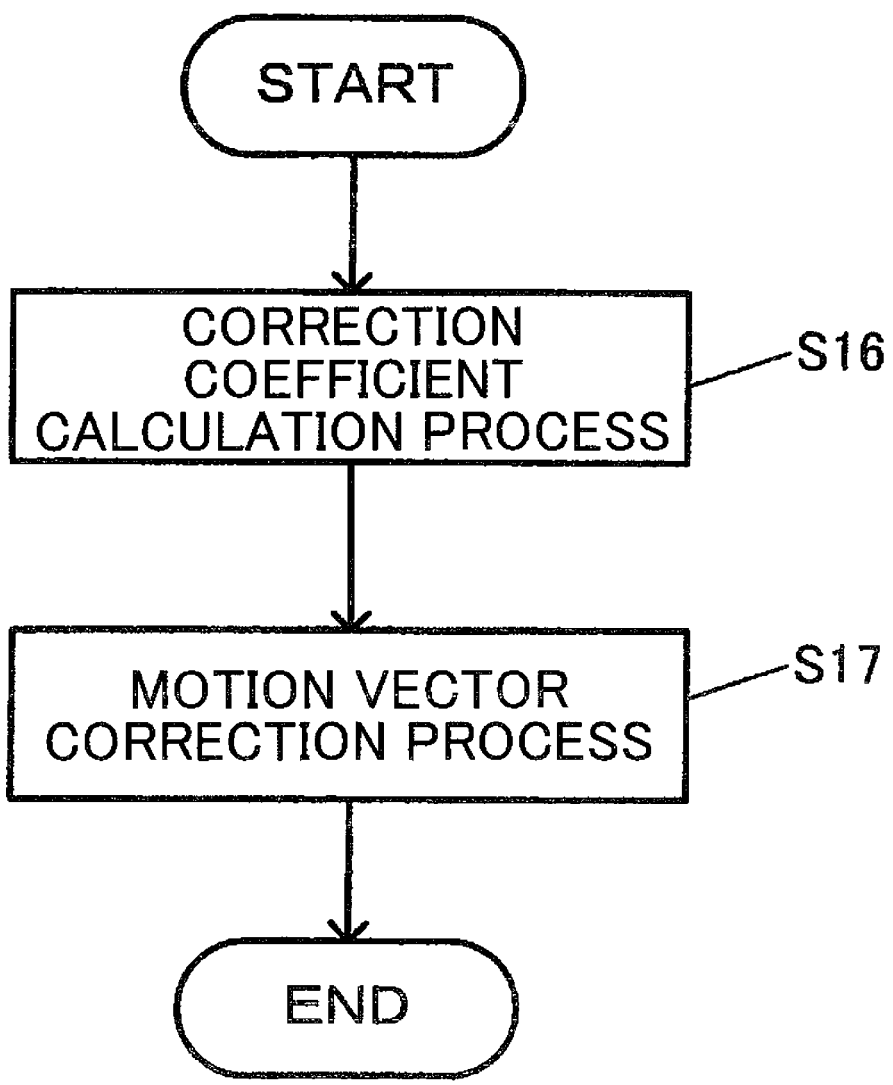
FIG. 13 is a flowchart illustrative of a special light motion vector information calculation process.

The details of the special light motion vector calculation process (step S8) shown in FIG. 12 are described below with reference to FIG. 13.

In a step S16, the image size (I, J) of the normal light image signal and the image size (K, L) of the special image signal are read from the memory, and the correction coefficient is calculated (see the expressions (5)). A transition to a step S17 then occurs. The step S16 corresponds to the process of the correction coefficient calculation section 502 shown in FIG. 11. In the step S17, the special light motion vector is calculated using the correction coefficient calculated in the step S16 (see the expressions (6)). The process shown in FIG. 12 is then performed. The step S17 corresponds to the process of the correction section 503 shown in FIG. 11.

In the first embodiment, motion vector is calculated using the current-frame normal light/special light image signal and the preceding-frame normal light/special light image signal, and corrected, and the noise reduction process is then performed in order to perform the image signal process in real time. Note that the configuration is not limited thereto. When performing a capsule endoscope image signal process, for example, an image signal captured by the capsule endoscope is stored in a recording medium. The image signal is read from the recording medium, and processed based on software. In this case, the motion vector may be calculated using the subsequent-frame normal light/special light image signal captured after the current-frame normal light/special light image signal, and the noise reduction process may then be performed. In the first embodiment, the motion vector is calculated using the current-frame normal light/special light image signal and one preceding-frame normal light/special light image signal, and the noise reduction process is then performed. Note that the motion vector may be calculated using a plurality of preceding-frame (or subsequent-frame) normal light/special light image signals, and the noise reduction process may then be performed.

According to the first embodiment, the image processing device includes the normal light image acquisition section 213 that acquires the normal light image, the special light image acquisition section 214 that acquires the special light image, the normal light motion vector information calculation section 215 that calculates the motion vector information between a plurality of normal light images based on the feature quantity included in the normal light image, and the noise reduction section (special light noise reduction section 218 shown in FIG. 3) that reduces the amount of noise included in the special light image based on the normal light motion vector information, as shown in FIG. 3.

The normal light image refers to an image that includes information within the wavelength band of white light corresponding to the RGB signal as shown in FIG. 4, and the special light image refers to an image that includes information within a specific wavelength band as shown in FIG. 5. The normal light motion vector information may be the motion vector between a plurality of normal light images, or may be information equivalent to the motion vector. For example, the normal light motion vector information may be information that achieves an effect equal to that achieved when using the normal light motion vector.

This makes it possible to implement an image processing device that can reduce the amount of noise included in the special light image by acquiring the normal light image and the special light image, and calculating the normal light motion vector information from the normal light image. Therefore, a problem that occurs in the noise reduction process that utilizes the motion vector information between a plurality of special light images (e.g., a frame-cyclic noise reduction process that calculates the difference between the preceding-frame special light image and the current-frame special light image) (i.e., accurate motion vector information (special light motion vector information) cannot be calculated since the special light image is dark) can be solved by utilizing the normal light motion vector information about the bright normal light image. This makes it possible to efficiently reduce noise.

The normal light image acquisition section 213 may acquire a first normal light image at a first timing, and may acquire a second normal light image at a second timing. The normal light motion vector information calculation section 215 may calculate the normal light motion vector information between the first normal light image and the second normal light image based on the feature quantity included in the first normal light image and the feature quantity included in the second normal light image. Specifically, the normal light motion vector information calculation section 215 may calculate the normal light motion vector information by performing the matching process shown in FIG. 8 using the feature quantity included in the first normal light image and the feature quantity included in the second normal light image.

This makes it possible to calculate the normal light motion vector information using normal light images acquired at different timings (e.g., in different frames). Specifically, the normal light motion vector information can be calculated by performing a block-unit or pixel-unit matching process (see FIG. 8).

As shown in FIG. 10, the image processing device may include the special light motion vector information calculation section 216 that calculates the special light motion vector information based on the normal light motion vector information. As shown in FIG. 11, the special light motion vector information calculation section 216 may include the correction section 503 that corrects the normal light motion vector information based on the normal light image and the special light image. Specifically, the correction section 503 may correct the normal light motion vector information based on the result of comparison between the resolution of the normal light image and the resolution of the special light image. More specifically, the correction section 503 may correct the normal light motion vector information by multiplying the normal light motion vector information by a scale factor specified by the result of comparison between the resolution of the normal light image and the resolution of the special light image.

The special light motion vector information may be the motion vector between a plurality of special light images, or may be information equivalent to the motion vector. For example, the special light motion vector information may be information that achieves an effect equal to that achieved when using the special light motion vector.

This makes it possible to utilize the normal light motion vector information after appropriately correcting the normal light motion vector information instead of directly utilizing the normal light motion vector information. For example, when using two imaging elements as shown in FIG. 10, the normal light image and the special light image may differ in resolution. In this case, the normal light motion vector information is corrected based on the resolution ratio. For example, the normal light motion vector information may be corrected using the expressions (5) and (6).

The special light image acquisition section 214 may acquire a first special light image at a first timing, and may acquire a second special light image at a second timing. The noise reduction section (special light noise reduction section 218 shown in FIG. 3) may set a first processing target area within the first special light image, and may set a second processing target area corresponding to the first processing target area within the second special light image based on the normal light motion vector information. The noise reduction section may reduce the amount of noise included in the first processing target area or the second processing target area based on the feature quantity included in the first processing target area and the feature quantity included in the second processing target area.

This makes it possible to acquire special light images at different timings (e.g., in different frames), and set a corresponding area in each image based on the normal light motion vector information. The noise reduction process can be performed on either area using the feature quantity included in each area. Specifically, since the two areas are linked based on the motion vector information, an identical object is ideally captured. Therefore, it is considered that a component due to noise is mainly included in the feature quantity comparison result since a component due to the object is suppressed.

The noise reduction section (special light noise reduction section 218) may include a noise amount estimation section that estimates a second amount of noise that is considered to be included in the second processing target area based on the differential value between the feature quantity included in the first processing target area and the feature quantity included in the second processing target area. The noise reduction section may reduce the amount of noise included in the second processing target area by calculating the difference between the second amount of noise estimated by the noise amount estimation section and the feature quantity included in the second processing target area.

The noise amount estimation section may acquire relationship information (e.g., noise model as shown in FIG. 9 or table data) that indicates the relationship between the differential value between the feature quantity included in the first processing target area and the feature quantity included in the second processing target area, and the second amount of noise to be estimated.

This makes it possible to perform the noise reduction process by estimating the amount of noise from the feature quantity differential value, and calculating the difference between the estimated amount of noise and the feature quantity included in the processing target area. A more appropriate noise reduction process can be performed by utilizing a noise model as shown in FIG. 9 when estimating the amount of noise from the feature quantity differential value.

The noise reduction section (special light noise reduction section 218) may reduce the amount of noise included in the first processing target area or the second processing target area by causing the differential value between the feature quantity included in the first processing target area and the feature quantity included in the second processing target area to approach zero.

This makes it possible to reduce the amount of noise without using the above noise model or the like. This is on the assumption that the feature quantity differential value is a noise component (ideal situation).

The term "specific wavelength band" may be a band that is narrower than the wavelength band of white light. Specifically, the special light image may be an in vivo image, and the specific wavelength band may be the wavelength band of light absorbed by hemoglobin in blood. More specifically, the specific wavelength band may be 390 to 445 nm or 530 to 550 nm.

This makes it possible to observe the structure of a surface area of tissues and a blood vessel located in a deep area. A lesion area (e.g., epidermoid cancer) that cannot be easily observed using normal light can be displayed as a brown area or the like by inputting the resulting signal to a given channel (R, G, or B), so that the lesion area can be reliably detected (i.e., a situation in which the lesion area is missed can be prevented). A wavelength band of 390 to 445 nm or 530 to 550 nm is selected from the viewpoint of absorption by hemoglobin and the ability to reach a surface area or a deep area of tissues. Note that the wavelength band is not limited thereto. For example, the lower limit of the wavelength band may decrease by about 0 to 10%, and the upper limit of the wavelength band may increase by about 0 to 10%, depending on a variation factor (e.g., experimental results for absorption by hemoglobin and the ability to reach a surface area or a deep area of a living body).

The special light image may be an in vivo image. The specific wavelength band included in the in vivo image may be the wavelength band of fluorescence emitted from a fluorescent substance. Specifically, the specific wavelength band may be 490 to 625 nm.

This enables autofluorescence imaging (AFI). Intrinsic fluorescence from a fluorescent substance (e.g., collagen) can be observed by applying excitation light (390 to 470 nm). In this case, the lesion area can be enhanced (highlighted) in a color differing from that of a normal mucous membrane, so that the lesion area can be reliably detected, for example. A wavelength band of 490 to 625 nm is the wavelength band of fluorescence emitted from a fluorescent substance (e.g., collagen) when excitation light is applied. Note that the wavelength band is not limited thereto. For example, the lower limit of the wavelength band may decrease by about 0 to 10%, and the upper limit of the wavelength band may increase by about 0 to 10%, depending on a variation factor (e.g., experimental results for the wavelength band of fluorescence emitted from a fluorescent substance). A pseudo-color image may be generated by simultaneously applying light having a wavelength band of 540 to 560 nm that is absorbed by hemoglobin.

The special light image may be an in vivo image. The specific wavelength band included in the in vivo image may be the wavelength band of infrared light. Specifically, the specific wavelength band may be 790 to 820 nm or 905 to 970 nm.

This enables infrared imaging (IRI). Information about the vessel or the blood flow in a deep area of the mucous membrane that cannot be easily observed visually can be highlighted by intravenously injecting indocyanine green (ICG) (infrared marker) that easily absorbs infrared light, and applying infrared light within the above wavelength band, so that the depth of stomach cancer invasion or the therapeutic strategy can be determined, for example. An infrared marker exhibits maximum absorption in a wavelength band of 790 to 820 nm, and exhibits minimum absorption in a wavelength band of 905 to 970 nm. Note that the wavelength band is not limited thereto. For example, the lower limit of the wavelength band may decrease by about 0 to 10%, and the upper limit of the wavelength band may increase by about 0 to 10%, depending on a variation factor (e.g., experimental results for absorption by the infrared marker).

The first embodiment of the invention also relates to a program that causes a computer to function as the normal light image acquisition section 213, the special light image acquisition section 214, the normal light motion vector information calculation section 215, and the noise reduction section (special light noise reduction section 218).

This makes it possible to store image data (e.g., capsule endoscope), and process the stored image data by software using a computer system (e.g., PC).

3. Second Embodiment

FIG. 14 is a view showing the configuration of an endoscope system that includes an image processing device according to a second embodiment of the invention. The endoscope system includes a light source section 601, an insertion section 102, a light guide 103, a lens 201, an imaging element 206, an illumination control section 603, an A/D conversion section 604, a normal light image acquisition section 213, a special light image acquisition section 605, a normal light motion vector information calculation section 215, a special light motion vector information calculation section 606, a normal light noise reduction section 217, a special light noise reduction section 218, an output section 219, an external I/F 220, a control section 221, a normal light image storage section 222, and a special light image storage section 223.

The following description focuses on the difference from the first embodiment.

Figure 15:
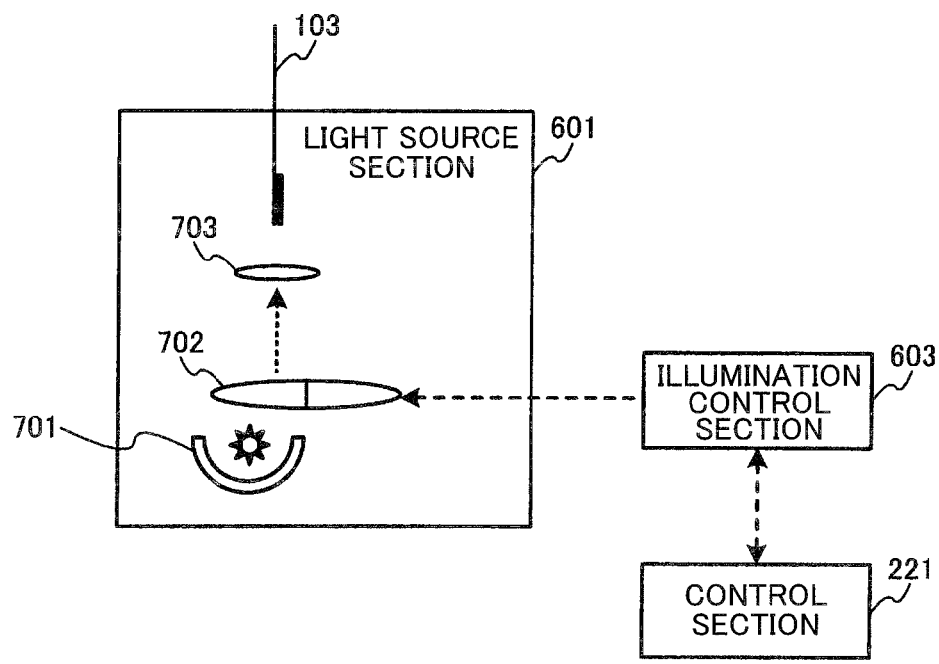
FIG. 15 shows a configuration example of a light source section.

FIG. 15 shows an example of the configuration of the light source section 601. The light source section 601 includes a normal light source 701, a rotary filter 702, and a condenser lens 703. Light emitted from the normal light source 701 is applied to the rotary filter 702, and enters a light guide 103 via the condenser lens 703. The illumination control section 603 is connected to the rotary filter 702. The control section 221 is bidirectionally connected to the illumination control section 603.

Figure 16:
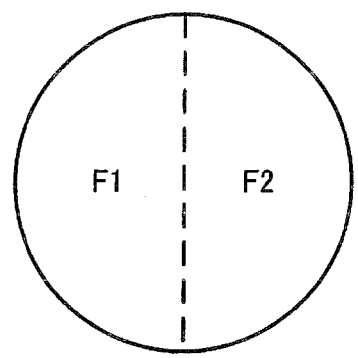
FIG. 16 shows a configuration example of a rotary filter.

FIG. 16 shows an example of the configuration of the rotary filter 702. The rotary filter 702 includes color filters F1 and F2, and is evenly divided into two areas. The filter F1 has the RGB transmittance characteristics (400 to 700 nm) shown in FIG. 4, and the filter F2 has the narrow-band transmittance characteristics (G1 (530 to 550 nm), B1 (390 to 445 nm)) shown in FIG. 5. White light emitted from the normal light source 701 forms white light after passing through the filter F1, and forms special light (NBI) after passing through the filter F2.

In the second embodiment, the rotary filter 702 is rotated at a given speed under control of the illumination control section 603. White light emitted from the normal light source 701 thus alternately forms white light and special light via the filter F1 and the filter F2. The white light and the special light are sequentially applied to the light guide 103 via the condenser lens 703, and applied to the object 100. Specifically, the white light and the special light are sequentially applied to the object 100 at given time intervals, and the reflected light is applied to the imaging element 206 via the lens 201.

The imaging element 206 includes a Bayer color filter array that is used to form a normal light image. The imaging element 206 sequentially converts the reflected white light and the reflected special light into a normal light analog image signal and a special light analog image signal via photoelectric conversion. The normal light analog image signal and the special analog image signal are sequentially transmitted to the A/D conversion section 604.

The normal light analog image signal is digitized to obtain a normal light digital image signal (hereinafter referred to as "normal light image signal"), and transmitted to the normal light image acquisition section 213 under control of the control section 221. The special light analog image signal is digitized to obtain a special light digital image signal (hereinafter referred to as "special light image signal"), and transmitted to the special light image acquisition section 605.

The special light image acquisition section 605 performs an image process on the special light image signal under control of the control section 221. Specifically, a known Bayer interpolation process (i.e., a process that converts a Bayer image signal into an RGB image signal) is performed. In this case, since the special light image signal is formed from the reflected light having the narrow-band spectral characteristics (G1 (530 to 550 nm), B1 (390 to 445 nm)), the R channel image signal obtained by the interpolation process is not used. An NBI special light image (NBI pseudo-color image) is then generated using the expressions (2).

A color management process, a grayscale transformation process, and the like are then performed. The resulting special light image signal (RGB signal) is transmitted to the special light motion vector information calculation section 606.

The special light motion vector information calculation section 606 calculates the special light motion vector information using the normal light motion vector from the normal light motion vector information calculation section 215 under control of the control section 221. The details of the process are described below. In the second embodiment, since the normal light image signal and the special light image signal are sequentially formed at given equal time intervals, the normal light image signal and the special light image signal are formed at different timings. Therefore, the movement of the special light image signal formed at a different timing is predicted using the normal light motion vector based on the normal light image signal, and the correction amount of the special light motion vector is estimated. For example, when a normal light image signal 1, a special light image signal 1, a normal light image signal 2, a special light image signal 2, and a normal light image signal 3 are formed in this order, since the normal light image signals and the special light image signals are formed at identical time intervals, the special light motion vector between the special light image signal 1 and the special light image signal 2 is calculated by the following expressions (7) using the normal light motion vector calculated from the normal light image signals 1, 2, and 3.

$$u=(U1+U2)/2$$

$$v=(V1+V2)/2 \quad (7)$$

Note that (u, v) is the special light motion vector between the special light image signal 1 and the special light image signal 2, (U1, V1) is the normal light motion vector between the normal light image signal 1 and the normal light image signal 2, and (U2, V2) is the normal light motion vector between the normal light image signal 2 and the normal light image signal 3.

Figure 17:
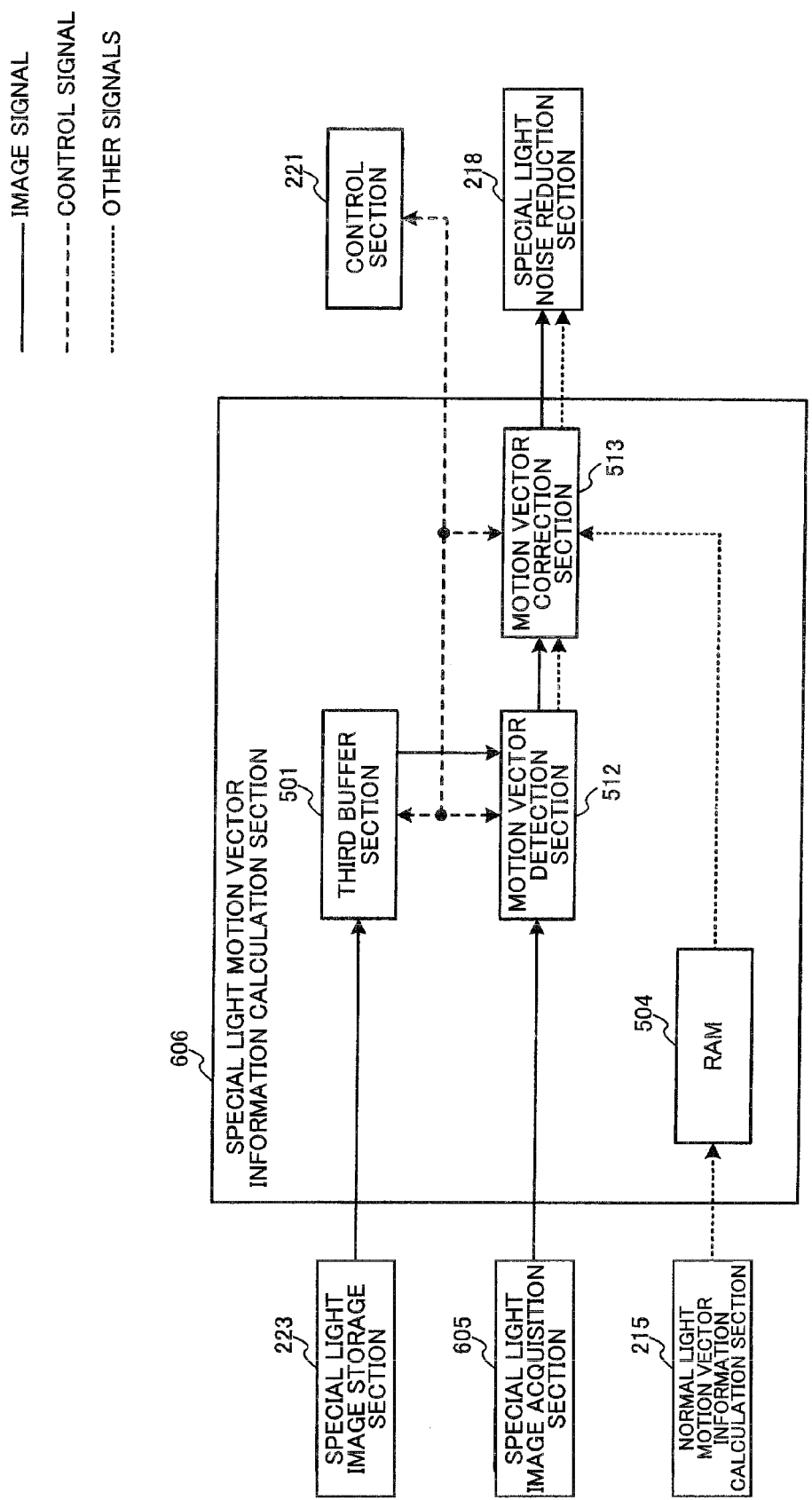
FIG. 17 shows another configuration example of a special light motion vector information calculation section.

FIG. 17 shows a modification of the configuration of the special light motion vector information calculation section 606. The special light motion vector information calculation section 606 includes a third buffer section 501, a motion vector detection section 512, a motion vector correction section 513, and a RAM 504. The special light image acquisition section 605 is connected to the special light noise reduction section 218 via the motion vector detection section 512 and the motion vector correction section 513. The special light image storage section 223 is connected to the motion vector detection section 512 via the third buffer section 501. The normal light motion vector information calculation section 215 is connected to the motion vector correction section 513 via the RAM 504. The control section 221 is bidirectionally connected to the third buffer section 501, the motion vector detection section 512, the motion vector correction section 513, and the RAM 504.

In the second embodiment, the normal light image signal and the special light image signal having the same resolution (image size) are processed. The normal light motion vector information from the normal light motion vector information calculation section 215 is stored in the RAM 504.

The motion vector detection section 512 performs a known template matching process (in the same manner as the process performed on the normal light image signal) on the preceding-frame special light image signal from the special light image storage section 223 using the current-frame special light image signal from the special light image acquisition section 605 under control of the control section 221, and detects the special light motion vector.

However, since an image signal captured using special light having a wavelength band narrower than that of normal light is darker than normal light image, the effect of noise relatively increases. Therefore, when detecting the special light motion vector from only the special light image signal, the motion detection accuracy may decrease due to noise.

Therefore, the motion vector correction section 513 corrects the special light motion vector using the normal light motion vector information.

Figure 18:
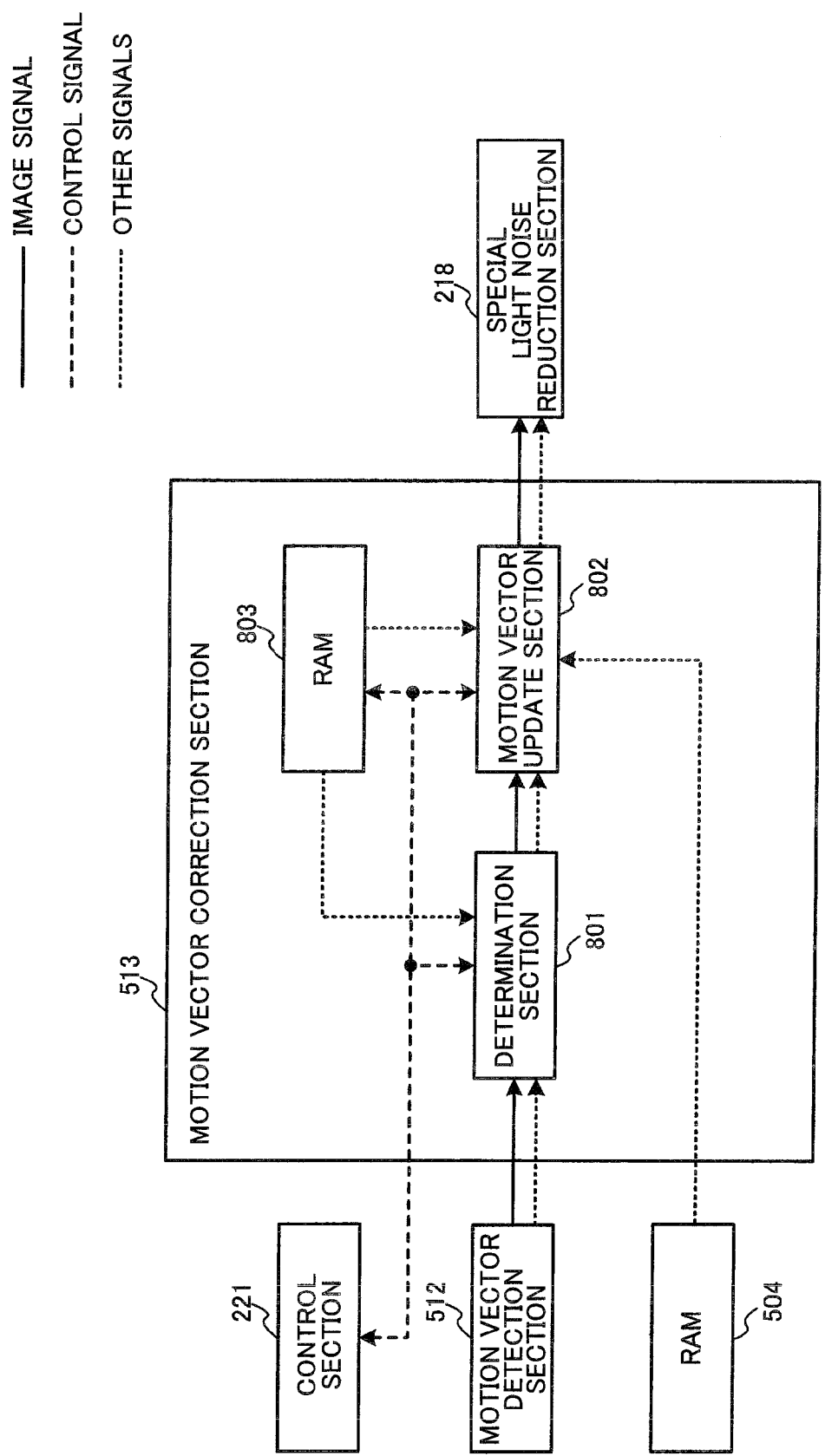
FIG. 18 shows a configuration example of a motion vector correction section.

FIG. 18 shows an example of the configuration of the motion vector correction section 513. The motion vector correction section 513 includes a determination section 801, a motion vector update section 802, and a RAM 803. The motion vector detection section 512 is connected to the special light noise reduction section 218 via the determination section 801 and the motion vector update section 802. The RAM 803 and the RAM 504 are connected to the motion vector update section 802. The control section 221 is bidirectionally connected to the determination section 801, the motion vector update section 802, and the RAM 803.

The determination section 801 performs a determination process on the current-frame special light image signal from the motion vector detection section 512 under control of the control section 221. Specifically, the determination section 801 performs the determination process on each pixel based on the Rch_v image signal value (having the spectral characteristics G1 shown in FIG. 5) and the magnitude of the special light image signal using a given threshold value from the RAM 803. The comparison information, the current-frame special light image signal, and the special light motion vector information are transmitted to the motion vector update section 802. The threshold value stored in the RAM 803 may be designated by the user via the external I/F 222 under control of the control section 221, or may be selected by the user via the external I/F 222 from a plurality of threshold value candidates stored in advance.

The motion vector update section 802 corrects the special light motion vector under control of the control section 221 using the threshold value comparison information from the determination section 801, the special light motion vector information, and the normal light motion vector information from the RAM 504. Specifically, the motion vector update section 802 does not correct the special light motion vector when the current-frame special light image signal value is larger than the threshold value. When the current-frame special light image signal value is smaller than the threshold value, the motion vector update section 802 replaces the special light motion vector with the normal light motion vector in the preceding/subsequent frame relative to the current-frame special light image calculated by the expressions (15). Specifically, when performing special light motion detection, the special light motion vector information is used for a bright area of the special light image signal, and the normal light motion vector is used for a dark area of the special light image signal. Therefore since the special light motion vector is detected from the special light image signal as much as possible, the special light motion vector detection accuracy can be improved.

An example in which the motion vector ((XN, YN)) calculated from the special light image or the normal light motion vector ((XW, YW)) is used as the special light motion vector has been described above. Note that another configuration may also be employed. For example, the motion vector calculated from the special light image may be blended with the normal light motion vector in a given ratio.

For example, two threshold values TH1 and TH2 (TH1<TH2 (TH1 is darker than TH2)) may be provided for pixel brightness information about the special light image. The motion vector (XW, YW) may be used when the value indicated by the brightness information about the special light image is smaller than the threshold value TH1, and the motion vector (XN, YN) may be used as the special light motion vector when the value indicated by the brightness information about the special light image is larger than the threshold value TH2. When the value indicated by the brightness information about the special light image is between the threshold values TH1 and TH2, the blending ratio α may be set based on the value indicated by the brightness information, and the special light motion vector (X, Y) may be calculated by the following expression (8).

$$(X, Y) = (XN \times (1-\alpha) + XW \times \alpha, YN \times (1-\alpha) + YW \times \alpha) \quad (8)$$

The image processing device according to the second embodiment may be implemented by software in the same manner as the image processing device according to the first embodiment. The details of the process according to the second embodiment are shown in FIG. 12.

The following description focuses on the difference from the first embodiment. The steps S1 to S6 are the same as in the first embodiment.

Figure 2:
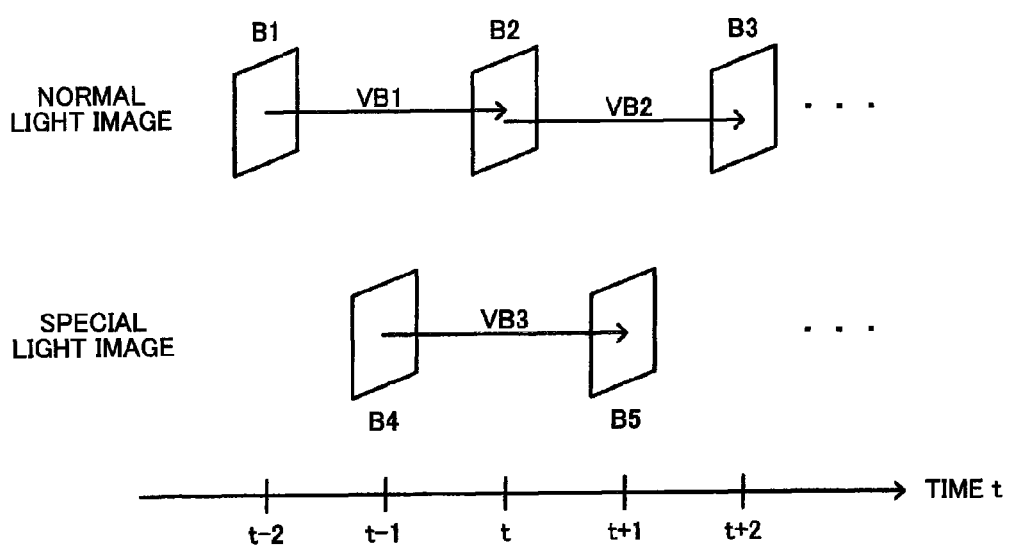
FIG. 2 is a view illustrative of the relationship between normal light motion vector information and special light motion vector information according to a second embodiment.

The normal light motion vector is acquired in the step S7. In the second embodiment, two normal light motion vectors are required in order to calculate a motion vector that corresponds to the special light motion vector, as described above (see FIG. 2). Therefore, two normal light motion vectors are acquired, differing from the first embodiment. As shown in FIG. 2, since the special light motion vectors VB1 and VB2 are required in order to calculate the special light motion vector VB3, the special light motion vector VB3 cannot be calculated at a timing when the special light image B5 has been acquired. Therefore, the special light motion vector VB3 is calculated at a timing at which a special light image B6 (not shown in FIG. 2) is acquired.

Figure 19:
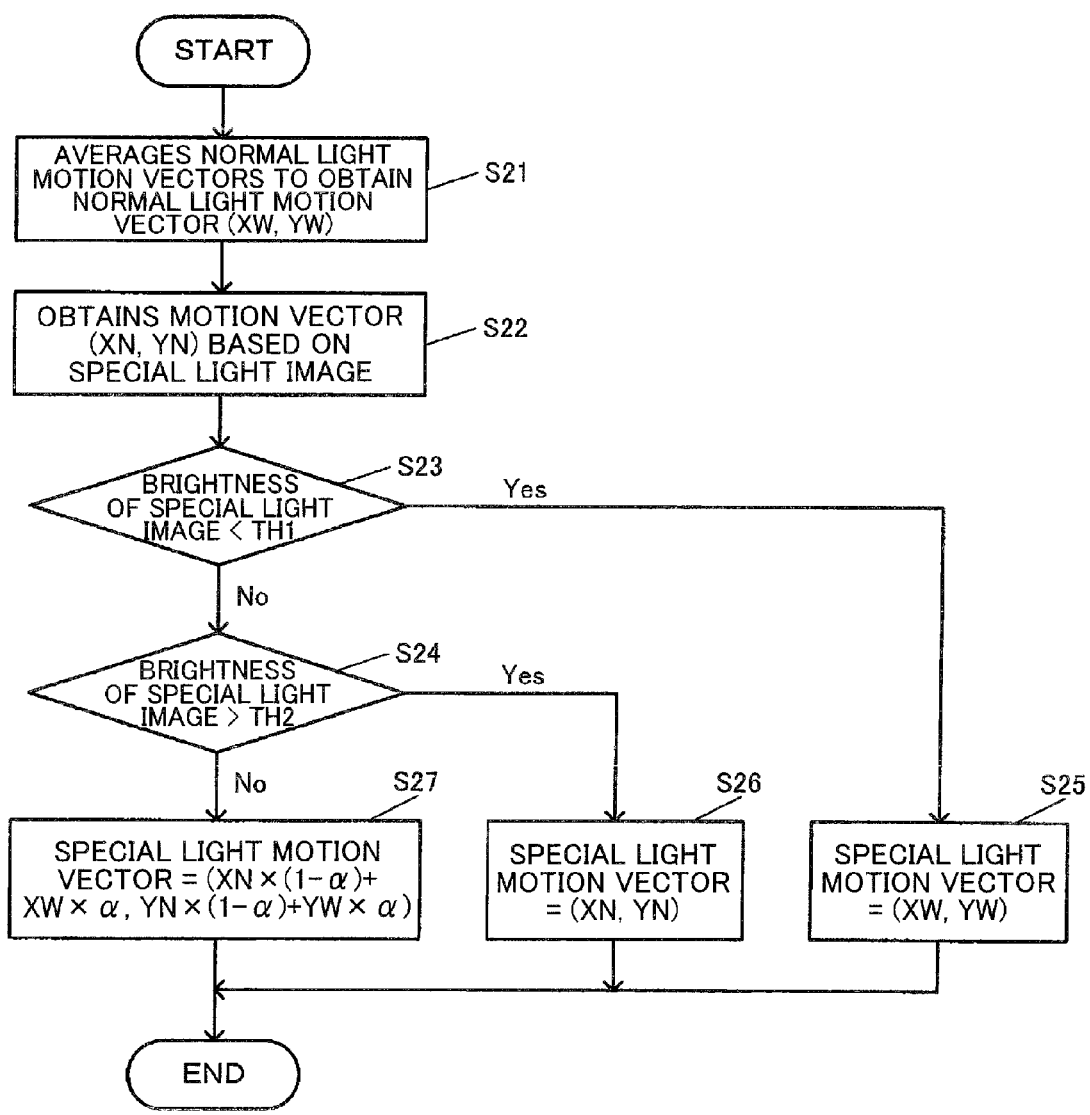
FIG. 19 is a flowchart illustrative of a special light motion vector information calculation process according to the second embodiment.

The special light motion vector is calculated in the step S8. FIG. 19 shows the process performed in the step S8. In a step S21, two normal light motion vectors that have been acquired are averaged to obtain a normal light motion vector (XW, YW) corresponding to the special light motion vector.

The preceding-frame special light image signal and the current-frame special light image signal are then matched to obtain a motion vector (XN, YN) based on the special light image.

In a step S23, the brightness of the special light image is compared with the threshold value TH1. When the brightness of the special light image is less than the threshold value TH1, the special light motion vector is set to the normal light motion vector (XW, YW) (step S25). When the brightness of the special light image is equal to or greater than the threshold value TH1, the brightness of the special light image is compared with the threshold value TH2. When the brightness of the special light image is greater than the threshold value TH2, the special light motion vector is set to the motion vector (XN, YN) (step S26).

When the brightness of the special light image is equal to or less than the threshold value TH2 in the step S24, the special light motion vector is set to a vector obtained by blending the motion vectors (XW, YW) and (XN, YN) (see the expression (8)).

When the normal light image and the special light image differ in resolution, the motion vector (XW, YW) is corrected using the expressions (5) and (6) in the same manner as in the modification of the first embodiment. The correction process may be performed after the step S21, for example.

The process performed in the step S9 after the special light motion vector has been calculated is the same as in the first embodiment.

As described above, when the image processing device process the normal light image signal and the special light image signal that are sequentially captured in time series, the special light motion vector can be estimated predicting the motion of the special light image signal captured at a different timing by averaging the normal light motion vectors acquired before and after the special light image signal in time series, or blending the normal light motion vector and the special light motion vector, and the noise reduction effect on the special light image signal can be improved by utilizing the special light motion vector. Therefore, the diagnostic capability using the special light image signal is improved.

As shown in FIG. 14, the image processing device according to the second embodiment includes the special light motion vector information calculation section 606 that calculates the special light motion vector information based on the normal light motion vector information. The noise reduction section (special light noise reduction section 218 shown in FIG. 14) reduces the amount of noise included in the special light image based on the special light motion vector information.

This makes it possible to calculate the special light motion vector information based on the normal light motion vector information even if the normal light image and the special light image are not acquired at the same time (see FIG. 2), so that an efficient noise reduction process can be implemented.

The special light image acquisition section 605 may acquire a first special light image at a first timing, and may acquire a second special light image at a second timing. The special light motion vector information calculation section 606 may calculate the special light motion vector information between the first special light image and the second special light image based on the normal light motion vector information. The noise reduction section may reduce the amount of noise included in the first special light image or the second special light image using the special light motion vector information.

This makes it possible to calculate the special light motion vector information between special light images acquired at different timings (e.g., in different frames). For example, the special light motion vector information VB3 between the special light images B4 and B5 can be calculated (see FIG. 2).

The normal light image acquisition section 213 may acquire a plurality of normal light images in time series, and the special light image acquisition section 605 may acquire a plurality of special light images in time series. The normal light motion vector information calculation section 215 may calculate first normal light motion vector information based on normal light images acquired before and after a kth (k is a natural number) special light image among the plurality of special light images in time series. The normal light motion vector information calculation section 215 may calculate second normal light motion vector information based on normal light images acquired before and after the (k+1)th special light image in time series. The special light motion vector information calculation section 606 may calculate the special light motion vector information between the kth special light image and the (k+1)th special light image based on the first normal light motion vector information and the second normal light motion vector information.

Specifically, when the normal light image and the special light image are not acquired at the same time (see FIG. 2), the normal light motion vector information is calculated using normal light images acquired before and after each of a plurality of (two in this example) special light images in time series. The special light motion vector information can be calculated by utilizing the calculated normal light motion vector information. In the example shown in FIG. 2, the normal light motion vector information VB1 is calculated using the normal light images B1 and B2 acquired before and after the special light image B4. The first half of the normal light motion vector information VB1 is irrelevant to the calculation target special light motion vector information, but the second half of the normal light motion vector information VB1 overlaps the calculation target special light motion vector information. Likewise, the first half of the normal light motion vector information VB2 calculated using the normal light images B2 and B3 acquired before and after the special light image B5 overlaps the calculation target special light motion vector information. The special light motion vector information can be estimated (predicted) using these overlapping areas.

Specifically, the normal light images acquired before and after the kth special light image in time series may be a pth (p is a natural number) normal light image and a (p+1)th normal light image, and the normal light images acquired before and after the (k+1)th special light image in time series may be a qth (q is a natural number) normal light image and a (q+1)th normal light image. The pth normal light image and the (p+1)th normal light image may or may not be acquired immediately before and immediately after the kth special light image. Likewise, the qth normal light image and the (q+1)th normal light image may or may not be acquired immediately before and immediately after the (k+1)th special light image.

The configuration illustrated in connection with the second embodiment corresponds to a case where the pth normal light image and the (p+1)th normal light image are acquired immediately before and immediately after the kth special light image, the qth normal light image and the (q+1)th normal light image are acquired immediately before and immediately after the (k+1)th special light image, and the relationship "p+1=q" is satisfied (see FIG. 2). Specifically, the normal light image and the special light image are alternately acquired. In this case, the special light motion vector information calculation section 606 may calculate the special light motion vector information between the kth special light image and the (k+1)th special light image by averaging the first normal light motion vector information and the second normal light motion vector information. This is evident from the fact that the sum of the second half of the normal light motion vector information VB1 and the first half of the normal light motion vector information VB2 corresponds to the special light motion vector information VB3, as shown in FIG. 2.

The first and second embodiments according to the invention and the modifications thereof have been described above. Note that the invention is not limited thereto. Various modifications and variations may be made without departing from the scope of the invention. A plurality of elements of each of the first and second embodiments and the modifications thereof may be appropriately combined. For example, some of the elements may be omitted from the first and second embodiments and the modifications thereof. Some of the elements described in connection with the first and second embodiments and the modifications thereof may be appropriately combined. Specifically, various modifications and applications are possible without materially departing from the novel teachings and advantages of the invention.

What is claimed is:

1. An image processing device, comprising:
   a normal light image acquisition section that acquires a plurality of normal light images in time series as the normal light image, the normal light image being an image that includes information within a wavelength band of white light;
   a special light image acquisition section that acquires a plurality of special light images in time series as the special light image, the special light image being an image that includes information within a specific wavelength band;
   a normal light motion vector information calculation section that calculates normal light motion vector information based on a feature quantity included in the normal light image, the normal light motion vector information indicating a motion vector between a plurality of normal light images;
   a special light motion vector information calculation section, and
   a noise reduction section that reduces an amount of noise included in the special light image based on the normal light motion vector information calculated by the normal light motion vector information calculation section, wherein
   the normal light motion vector information calculation section calculating first normal light motion vector information based on a plurality of normal light images acquired before and after a kth (k is a natural number) special light image among the plurality of special light images in time series, and calculating second normal light motion vector information based on a plurality of normal light images acquired before and after a (k+1)th special light image among the plurality of special light images in time series; and
   the special light motion vector information calculation section calculating special light motion vector information between the kth special light image and the (k+1)th special light image based on the first normal light motion vector information and the second normal light motion vector information.

2. The image processing device as defined in claim 1,
   the normal light motion vector information calculation section calculating the first normal light motion vector information based on a pth (p is a natural number) normal light image acquired before a kth (k is a natural number) special light image among the plurality of special light images in time series, and a (p+1)th normal light image acquired after the kth special light image in time series, and calculating the second normal light motion vector information based on a qth (q is a natural number) normal light image acquired before a (k+1)th special light image among the plurality of special light images in time series, and a (q+1)th normal light image acquired after the (k+1)th special light image in time series; and
   the special light motion vector information calculation section calculating special light motion vector information between the kth special light image and the (k+1)th special light image based on the first normal light motion vector information and the second normal light motion vector information.

3. The image processing device as defined in claim 1,
   the special light motion vector information calculation section calculating motion vector information obtained by averaging the first normal light motion vector information and the second normal light motion vector information as the special light motion vector information between the kth special light image and the (k+1)th special light image.

4. The image processing device as defined in claim 1,
   the specific wavelength band being narrower than the wavelength band of the white light.

5. The image processing device as defined in claim 1,
   each of the normal light image and the special light image being an in vivo image; and
   the specific wavelength band included in the in vivo image being a wavelength band of fluorescence emitted from a fluorescent substance.

6. The image processing device as defined in claim 1,
each of the normal light image and the special light image being an in vivo image; and
the specific wavelength band included in the in vivo image being a wavelength band of infrared light.

7. A non-transitory information storage medium storing a program that causes a computer to function as:
 a normal light image acquisition section that acquires a plurality of normal light images in time series as the normal light image, the normal light image being an image that includes information within a wavelength band of white light;
 a special light image acquisition section that acquires a plurality of special light images in time series as the special light image, the special light image being an image that includes information within a specific wavelength band;
 a normal light motion vector information calculation section that calculates normal light motion vector information based on a feature quantity included in the normal light image, the normal light motion vector information indicating a motion vector between a plurality of normal light images;
 a special light motion vector information calculation section; and
 a noise reduction section that reduces an amount of noise included in the special light image based on the normal light motion vector information calculated by the normal light motion vector information calculation section, wherein
the normal light motion vector information calculation section calculating first normal light motion vector information based on a plurality of normal light images acquired before and after a kth (k is a natural number) special light image among the plurality of special light images in time series, and calculating second normal light motion vector information based on a plurality of normal light images acquired before and after a (k+1)th special light image among the plurality of special light images in time series; and
the special light motion vector information calculation section calculating special light motion vector information between the kth special light image and the (k+1)th special light image based on the first normal light motion vector information and the second normal light motion vector information.

\* \* \* \* \*